(12) United States Patent
Lee et al.

(10) Patent No.: US 7,324,178 B2
(45) Date of Patent: Jan. 29, 2008

(54) LIQUID CRYSTAL DISPLAY DEVICE HAVING A LIGHT PATH CHANGING MEANS HAVING A POROUS FILM WITH A PLURALITY OF PORES

(75) Inventors: Han-Ju Lee, Seoul (KR); Kweon-Sam Hong, Seoul (KR); Yoon-Sung Um, Yongin-si (KR); In-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 10/502,955

(22) PCT Filed: Jan. 27, 2003

(86) PCT No.: PCT/KR03/00175

§ 371 (c)(1),
(2), (4) Date: Jul. 29, 2004

(87) PCT Pub. No.: WO03/065112

PCT Pub. Date: Aug. 7, 2003

(65) Prior Publication Data

US 2005/0078241 A1    Apr. 14, 2005

(30) Foreign Application Priority Data

Feb. 1, 2002  (KR) ...................... 10-2002-0005942
Jul. 10, 2002  (KR) ...................... 10-2002-0040069

(51) Int. Cl.
*G02F 1/1335*    (2006.01)

(52) U.S. Cl. ..................................................... 349/113
(58) Field of Classification Search ................. 349/113
See application file for complete search history.

(56) References Cited

U.S. PATENT DOCUMENTS 5,473,450 A  * 12/1995 Yamada et al. ............... 349/84
6,642,976 B2 * 11/2003 Umemoto et al. ............ 349/65

FOREIGN PATENT DOCUMENTS

| | | |
|---|---|---|
| EP | 06 77 768 A1 | 10/1995 |
| EP | 1 139 013 A2 | 10/2001 |
| GB | 2 358 512 A | 7/2001 |

* cited by examiner

*Primary Examiner*—David Nelms
*Assistant Examiner*—Lucy Chien
(74) *Attorney, Agent, or Firm*—F. Chau & Associates, LLC

(57) ABSTRACT

Disclosed is a liquid crystal display device capable of improving a viewing angle thereof while reducing a gray scale inversion. The liquid crystal display device has a porous film aligned on a liquid crystal display panel and having a plurality of pores. The porous film has sidewalls defined by the pores and reflecting a part of light exited from the liquid crystal display panel. That is, the sidewalls reflect a first group of light, which has relatively higher luminance by passing through a short axis of liquid crystal, towards a second group of light having a relatively lower luminance by passing through a long axis of liquid crystal. Accordingly, the viewing angle of the liquid crystal display device is expanded and the gray scale inversion is reduced.

28 Claims, 43 Drawing Sheets

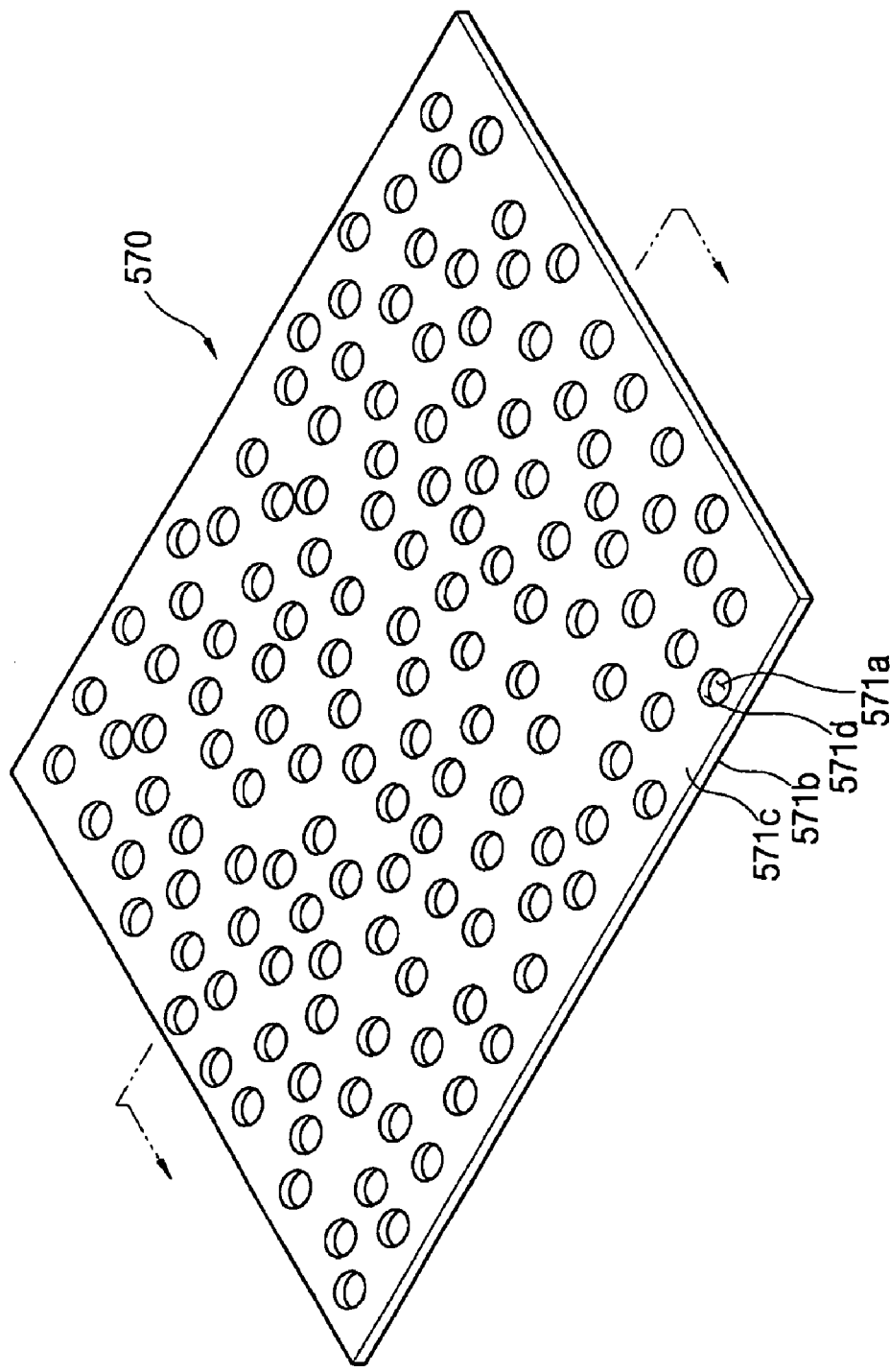

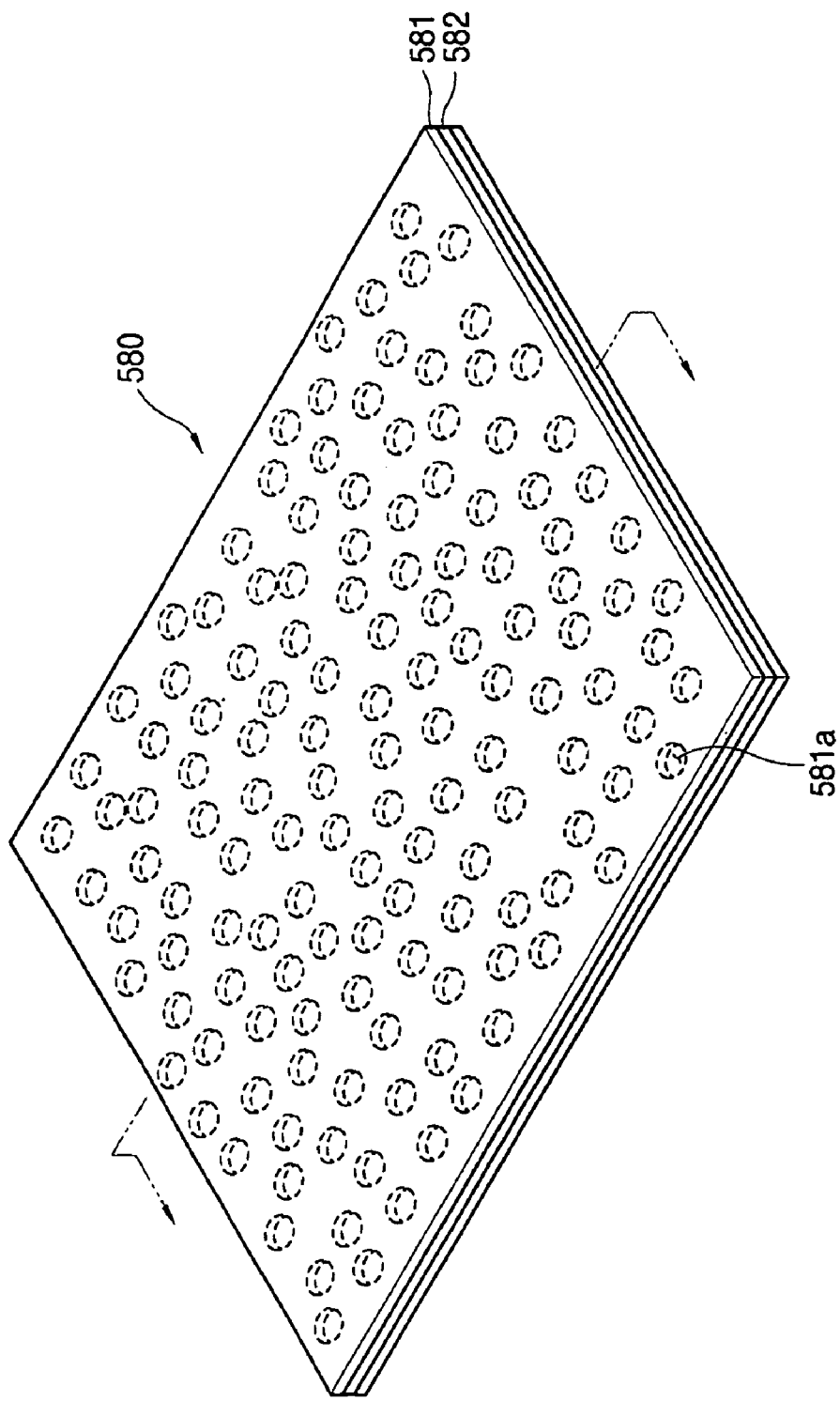

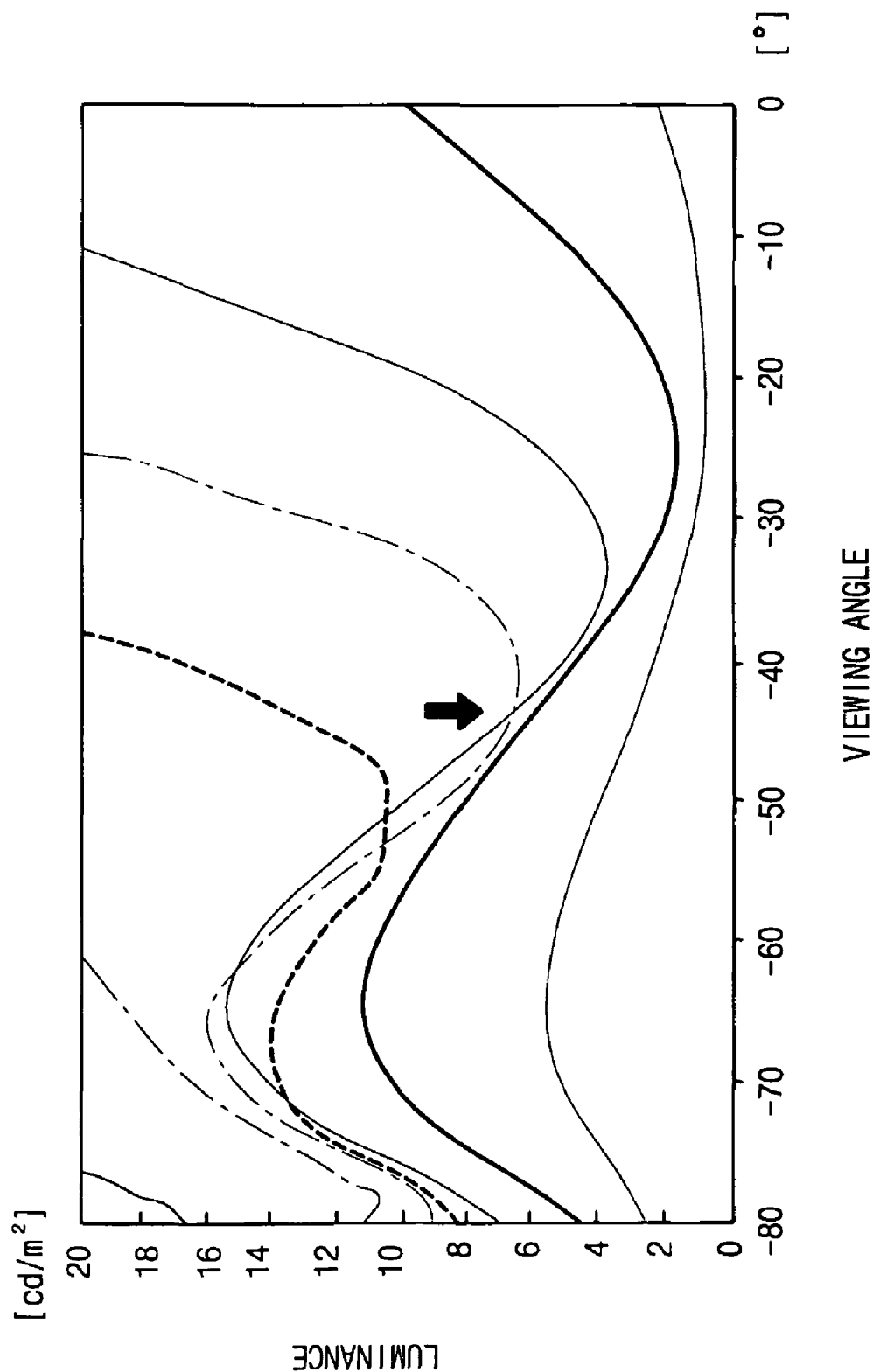

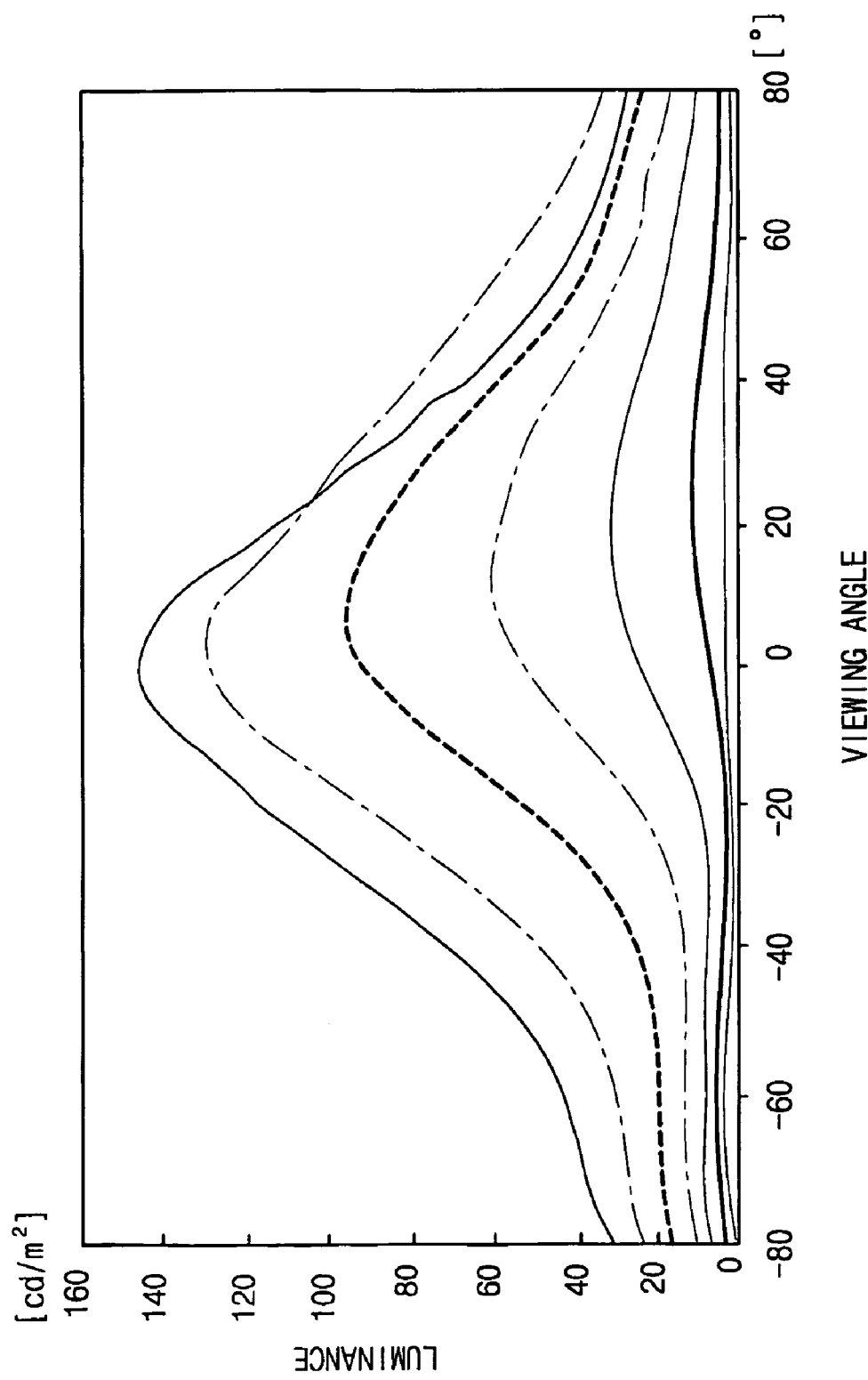

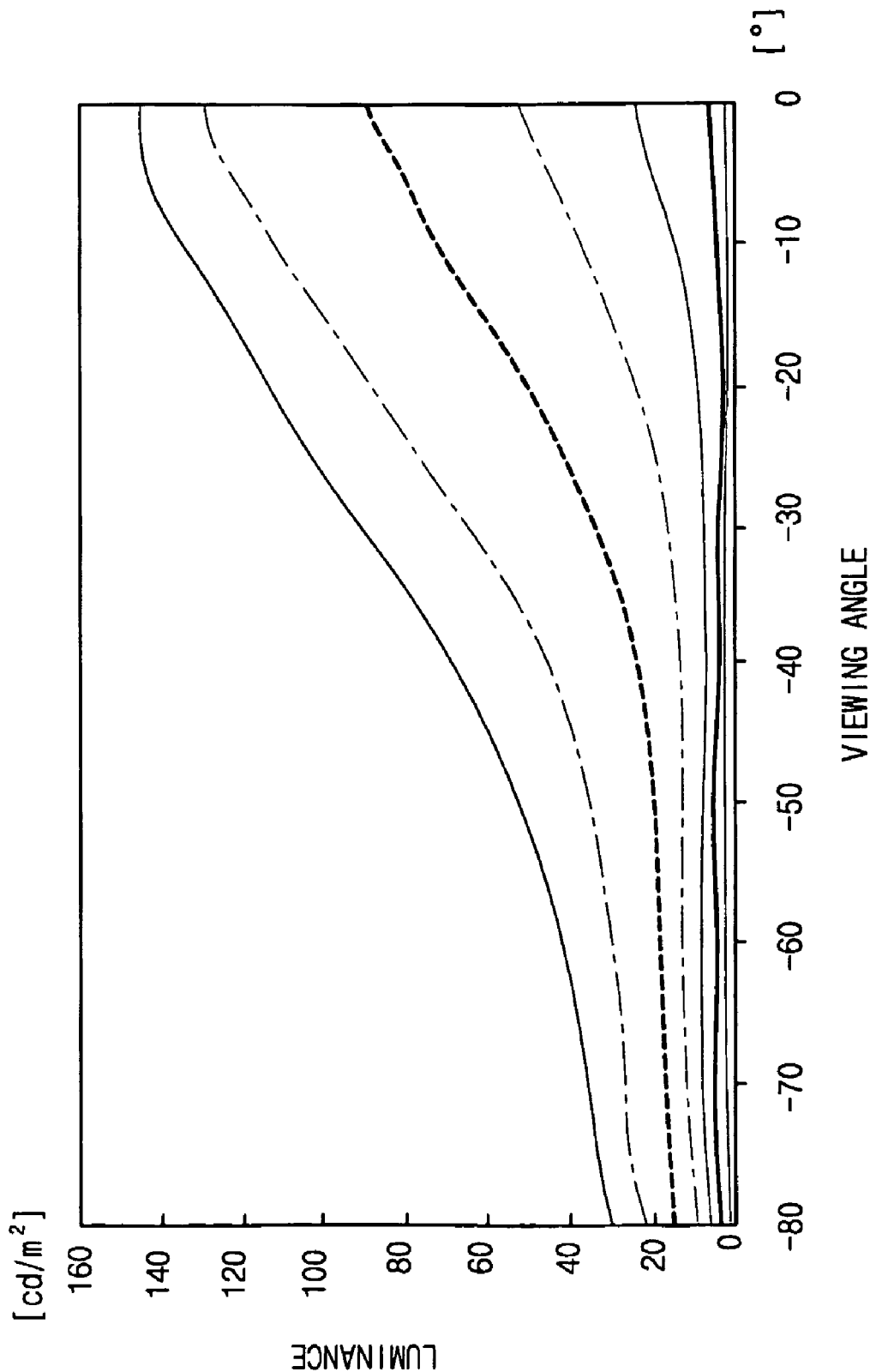

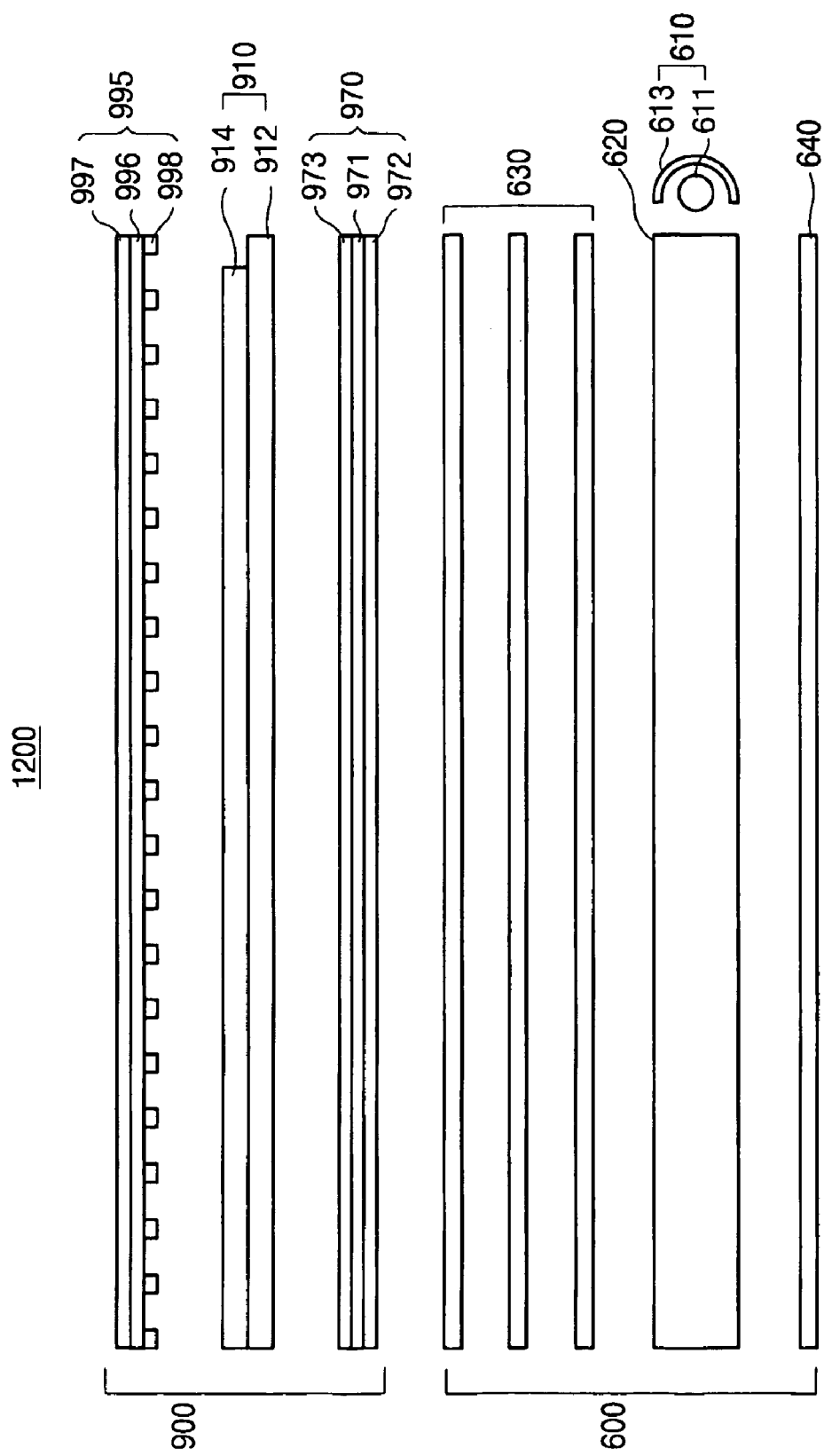

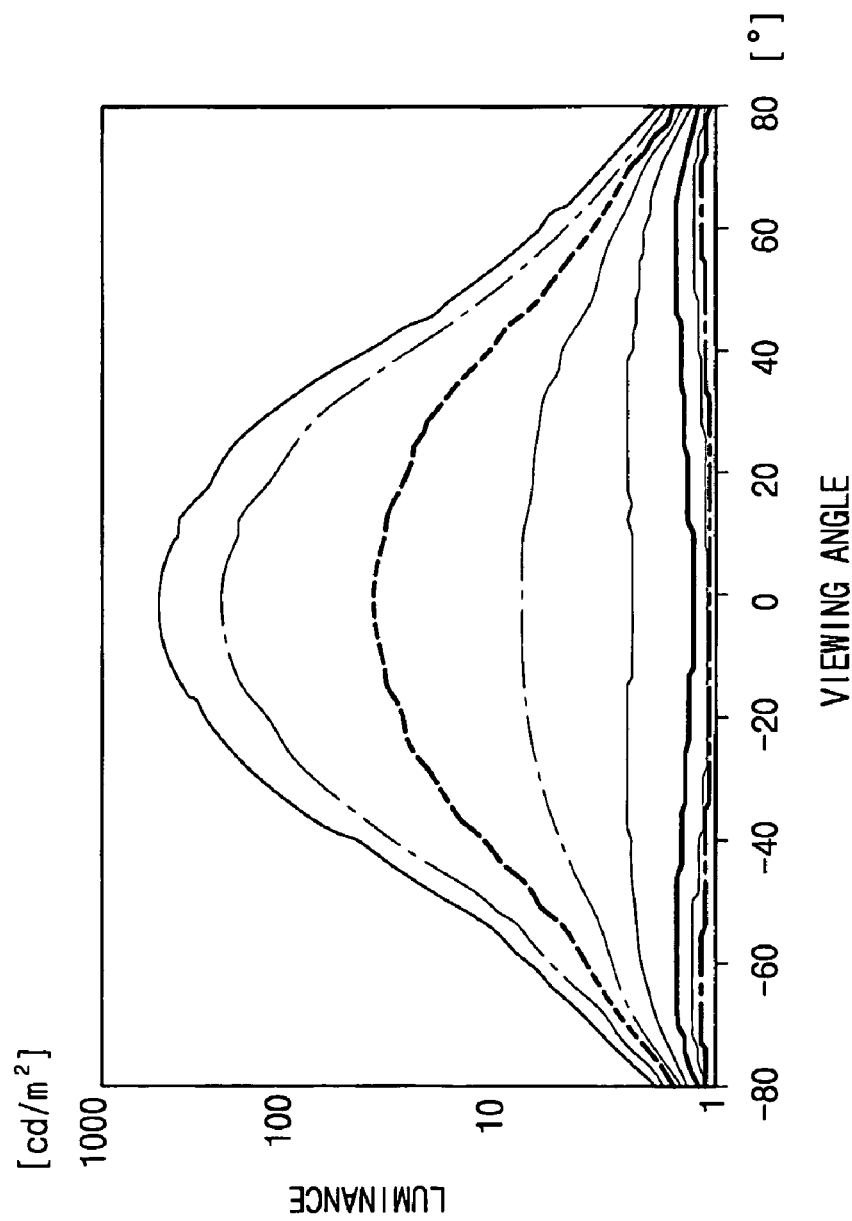

LIQUID CRYSTAL DISPLAY DEVICE HAVING A LIGHT PATH CHANGING MEANS HAVING A POROUS FILM WITH A PLURALITY OF PORES

TECHNICAL FIELD

The present invention relates to a liquid crystal display device, and more particularly to a liquid crystal display device capable of improving a viewing angle thereof and simultaneously capable of reducing a gray scale inversion.

BACKGROUND ART

Generally, a liquid crystal display (LCD) device includes a first substrate having a first electrode, a second substrate having a second electrode opposite to the first electrode, and liquid crystal disposed between the first and second substrates. The liquid crystal display device changes an alignment of liquid crystal by applying electric field to both the first and second electrodes to adjust quantity of light passing through liquid crystal, thereby displaying various images.

Twisted nematic (hereinafter, referred to TN) liquid crystal, in which a long axis of liquid crystal is continuously twisted from the first electrode towards the second electrode at a right angle, is mainly used in the liquid crystal display device.

Although TN liquid crystal is irregularly aligned, it has a predetermined alignment order with respect to an axis of liquid crystal. TN liquid crystal has different physical properties in a long axis direction and a short axis direction thereof, respectively. That is, TN liquid crystal has optically anisotropic characteristic.

Hereinafter, a conventional TN-type liquid crystal display device, which displays images by using above-mentioned TN liquid crystal, will be described.

FIG. 1 is an exploded perspective view of a conventional TN-type liquid crystal display device 400.

Referring to FIG. 1, the TN-type liquid crystal display device 400 includes a backlight unit 200 for generating light, a display unit 100 for receiving light from the backlight unit 200 to display images, a mold frame 250 for accommodating the backlight unit 200 and the display unit 100, and a chassis 300 therein.

The display unit 100 has a liquid crystal display panel 110 for displaying images, printed circuit boards 120 and 140 for supplying a driving signal and an image data signal to the liquid crystal display panel 110, and tape carrier packages (hereinafter, referred to TCP) 130 and 150 disposed between the liquid crystal display panel 110 and the printed circuit boards 120 and 140 in order to electrically connect the printed circuit boards 120 and 140 to the liquid crystal display panel 110.

The liquid crystal display panel 110 includes a thin film transistor substrate (hereinafter, referred to TFT substrate) 112 having thin film transistors (TFTs, not shown) and pixel electrodes (not shown), a color filter substrate 114 opposite to the TFT substrate 112 and having color filters and common electrode, and liquid crystal (not shown) disposed between the TFT substrate 112 and the color filter substrate 114.

In detail, the TFT substrate 112 includes a plurality of data lines (not shown) extended in a row direction thereof and a plurality of gate lines (not shown) extended in a column direction thereof. In addition, a plurality of TFTs are arranged on the TFT substrate 112 in a matrix shape. That is, source electrodes of the TFTs are connected to the data lines, and gate electrodes of the TFTs are connected to the gate lines. Drain electrodes of the TFTs are connected to the pixel electrodes.

One end of each data line is coupled to a data-side TCP 130 equipped with a data driver chip, and one end of each gate line is coupled to the gate-side TCP 150 equipped with a gate driver chip.

The data-side TCP 130 is connected to a data-side printed circuit board 120 so as to timely apply image data signal inputted from the data-side printed circuit board 120 to the data lines. In addition, the gate-side TCP 150 is connected to the gate-side printed circuit board 140 so as to apply a gate driving signal inputted from the gate-side printed circuit board 140 to the gate lines.

On the other hand, the backlight unit 200 includes a light source 210 for generating first light, and a light guiding plate 220 for guiding the first light towards the liquid crystal display panel 110. The light source 210 includes a lamp (lamps) 211 generating the first light and a lamp reflection plate 213 covering one side of the lamp (lamps) 211 to reflect the first light towards the light guiding plate 220.

The light guiding plate 220 is disposed at the other side of the lamp 211 and includes an incident surface through which the first light is incident, a reflection surface for guiding the first light towards the liquid crystal display panel 110, and an exiting surface for outputting the first light towards the liquid crystal display panel 110.

In addition, the backlight unit 200 includes a reflection plate 240 and a plurality of optical films 230. The reflection plate 240 is disposed below the light guiding plate 220 and reflects light leaked from the light guiding plate 220 towards the liquid crystal display panel 110. The plurality of optical films 230 allows the light outputted from the light guiding plate 220 to have uniformly distributed luminance.

Since the conventional TN type liquid crystal display device 400 having the above structure uses the TN crystal having optical-anisotropic characteristic, a color and a contrast ratio (C/R) of the images vary depending on viewing angles. Therefore, the conventional TN type liquid crystal display device 400 may limit a range of viewing angles for allowing a user to precisely recognize information displayed in a screen of the conventional TN type liquid crystal display device 400.

Although it is not shown in the figures, the conventional liquid crystal display device includes a compensating film (wide view film) having a discotic layer so as to solve the above problem. However, although the compensating film can improve the viewing angle, gray scale inversion occurs when the viewing angle exceeds a predetermined level.

That is, a normal gray level can be found when a user look at the liquid crystal display panel 110 at a front thereof However, an abnormal gray level is found when a viewing position of the user is changed upward or downward the front of the liquid crystal display panel 110. When the liquid crystal display panel 110 is viewed with a viewing angle exceeding a critical viewing angle, a white gray scale is erroneously recognized as a black gray scale, or the black gray scale is erroneously recognized as the while gray scale, called "gray scale inversion".

DISCLOSURE OF THE INVENTION

The present invention has been made to solve the above problems of the related art, therefore, it is an object of the present invention is to provide a liquid crystal display device capable of improving a viewing angle thereof while reducing a gray scale inversion.

In order to achieve the above object of the present invention, according to one aspect of the present invention, there is provided a liquid crystal display device comprising: a liquid crystal display panel for receiving a first light, and for radiating a second light having an image information, the liquid crystal display panel including: i) a first substrate on which a plurality of pixels having a first electrode is formed, ii) a second substrate on which a second electrode opposite to the first electrode is formed, and iii) a liquid crystal layer, disposed between the first and second substrate, which is aligned by an electric field applied between the first and second electrodes; and a light path changing means disposed on the liquid crystal display panel, the light path changing means including a reflection surface, the reflection surface reflecting a part of the second light and outputting a third light having a compensated luminance, and the reflection surface being extended in a first direction perpendicular to an upper surface of the liquid crystal display panel.

In one aspect of the invention, there is provided a liquid crystal display device comprising: a liquid crystal display panel for receiving a first light, and for radiating a second light having an image information, the liquid crystal display panel including: i) a first substrate on which a plurality of pixels having a first electrode is formed, ii) a second substrate on which a second electrode opposite to the first electrode is formed, and iii) a liquid crystal layer, disposed between the first and second substrate, which is aligned by an electric field applied between the first and second electrodes; and a polarizing plate disposed on the liquid crystal display panel, the polarizing plate including: i) a polarizing layer for polarizing the second light, and ii) a light path changing layer including a reflection surface, the reflection surface for reflecting a part of the second light and outputting a third light having a compensated luminance, the reflection surface extended in a first direction perpendicular to an upper surface of the liquid crystal display panel.

In further aspect, there is provided a liquid crystal display device comprising: a liquid crystal display panel for receiving a first light, and for radiating a second light having an image information, the liquid crystal display panel including: i) a first substrate on which a plurality of pixels having a first electrode is formed, ii) a second substrate on which a second electrode opposite to the first electrode is formed, and iii) a nematic liquid crystal, disposed between the first and second substrate, which is aligned by an electric field applied between the first and second electrodes; and a light path changing means disposed on the liquid crystal display panel, the light path changing means including a reflection surface, the reflection surface reflecting a part of a first group of the second light towards a second group of the second light, the first group of the second light passing through the nematic liquid crystal in a parallel direction with regard to a first axis of the nematic liquid crystal tilted at a predetermined angle by the electric field, the second group of the second light passing through the nematic liquid crystal in a parallel direction with regard to a second axis of nematic liquid crystal, and the second axis being perpendicular to the first axis of nematic liquid crystal.

In further aspect, there is provided a liquid crystal display device comprising: a liquid crystal display panel for receiving a first light, and for radiating a second light having an image information, the liquid crystal display panel including: i) a first substrate on which a plurality of pixels having a first electrode is formed, ii) a second substrate on which a second electrode opposite to the first electrode is formed, and iii) a nematic liquid crystal, disposed between the first and second substrate, which is aligned by an electric field applied between the first and second electrodes; and a polarizing plate disposed on the liquid crystal display panel, the polarizing plate including: i) a polarizing layer for polarizing the second light, and ii) a light path changing layer including a reflection surface, the reflection surface having a plurality of pores and inner sidewalls adjacent to each of the pores, the inner sidewalls reflecting a part of a first group of the second light towards a second group of the second light, the first group of the second light passing through the nematic liquid crystal in a parallel direction with regard to a first axis of the nematic liquid crystal tilted at a predetermined angle by the electric field, the second group of the second light passing through the nematic liquid crystal in a parallel direction with regard to a second axis of nematic liquid crystal, and the second axis being perpendicular to the first axis of nematic liquid crystal.

In further aspect, there is provided a liquid crystal display device comprising: a lower substrate including: i) a plurality of switching devices arranged in a matrix shape on a first substrate, ii) a first electrode electrically coupled to the switching devices, and iii) a first alignment layer deposited on the first substrate and having a first rubbing pattern extended in a first direction; an upper substrate including: i) a color filter formed on a second substrate, ii) a second electrode formed on the color filter, and iii) a second alignment layer deposited on the second electrode and having a second rubbing pattern extended in a second direction; a liquid crystal layer disposed between the upper and lower substrates; and a light path changing means including a plurality of pores and sidewalls being defined by the pores, the light path changing means disposed on the upper substrate and reflecting a part of a first light to output a second light having a compensated luminance distribution, the first light exited from the upper substrate and being incident into sidewalls of the light path changing means.

In further aspect, there is provided a liquid crystal display device comprising: a lower substrate including: i) a plurality of switching devices arranged in a matrix shape on a first substrate, ii) a first electrode electrically coupled to the switching devices, and iii) a first alignment layer deposited on the first substrate and having a first rubbing pattern extended in a first direction; an upper substrate including: i) a color filter formed on a second substrate, ii) a second electrode formed on the color filter, and iii) a second alignment layer deposited on the second electrode and having a second rubbing pattern extended in a second direction; a liquid crystal layer disposed between the upper and lower substrates; a first polarizing means, disposed on a lower surface of the lower substrate, for polarizing a first light incident into the lower substrate; and a second polarizing means, disposed on the upper substrate, for polarizing a second light exited from the upper substrate, and for reflecting a part of second light to output a third light having a compensated luminance.

According to the liquid crystal display device of the present invention, the porous film includes sidewalls defined by a plurality of pores and reflects a first group of light, which is exited from the liquid crystal display panel and passes through a short axis of liquid crystal, towards a second group of light passing through a long axis of liquid crystal. Therefore, a gray scale inversion can be reduced and the viewing angle of the liquid crystal display device can be expanded.

BRIEF DESCRIPTION OF THE DRAWINGS

The above object, and other features and advantages of the present invention will become more apparent by describing preferred embodiments thereof with reference to the attached drawings in which:

FIGS. 7A and 7B are views showing a second porous film according to another exemplary embodiment of the present invention;

FIGS. 8A and 8B are views showing a third porous film according to still another exemplary embodiment of the present invention;

FIGS. 11A to 11C are graphs showing luminance variation according to viewing angles obtained by using comparative sample 1;

FIGS. 12A to 12C are graphs showing luminance variation according to viewing angles obtained by using sample 1;

FIGS. 19 and 21 are sectional views showing a liquid crystal display device according to the exemplary fourth embodiment of the present invention;

FIGS. 24A to 24C are graphs showing simulation results obtained through comparative experiment 1.

BEST MODE FOR CARRYING OUT THE INVENTION

Figure 1:
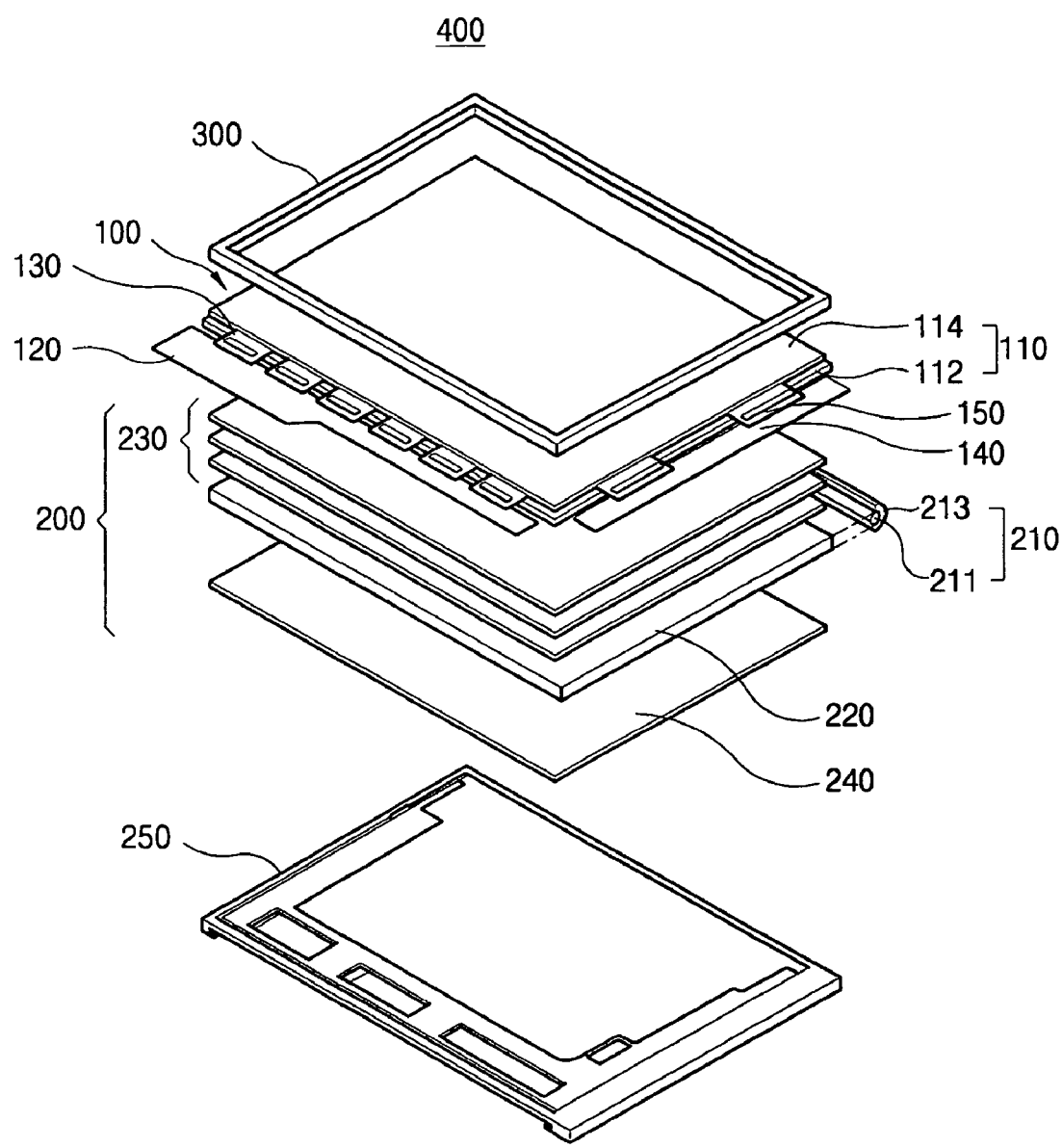
FIG. 1 is an exploded perspective view showing a conventional TN-type liquid crystal display device.

Hereinafter, preferred embodiments of the present invention will be described with reference to the accompanying drawings. The same reference numerals are used to refer the same elements.

Figure 2:
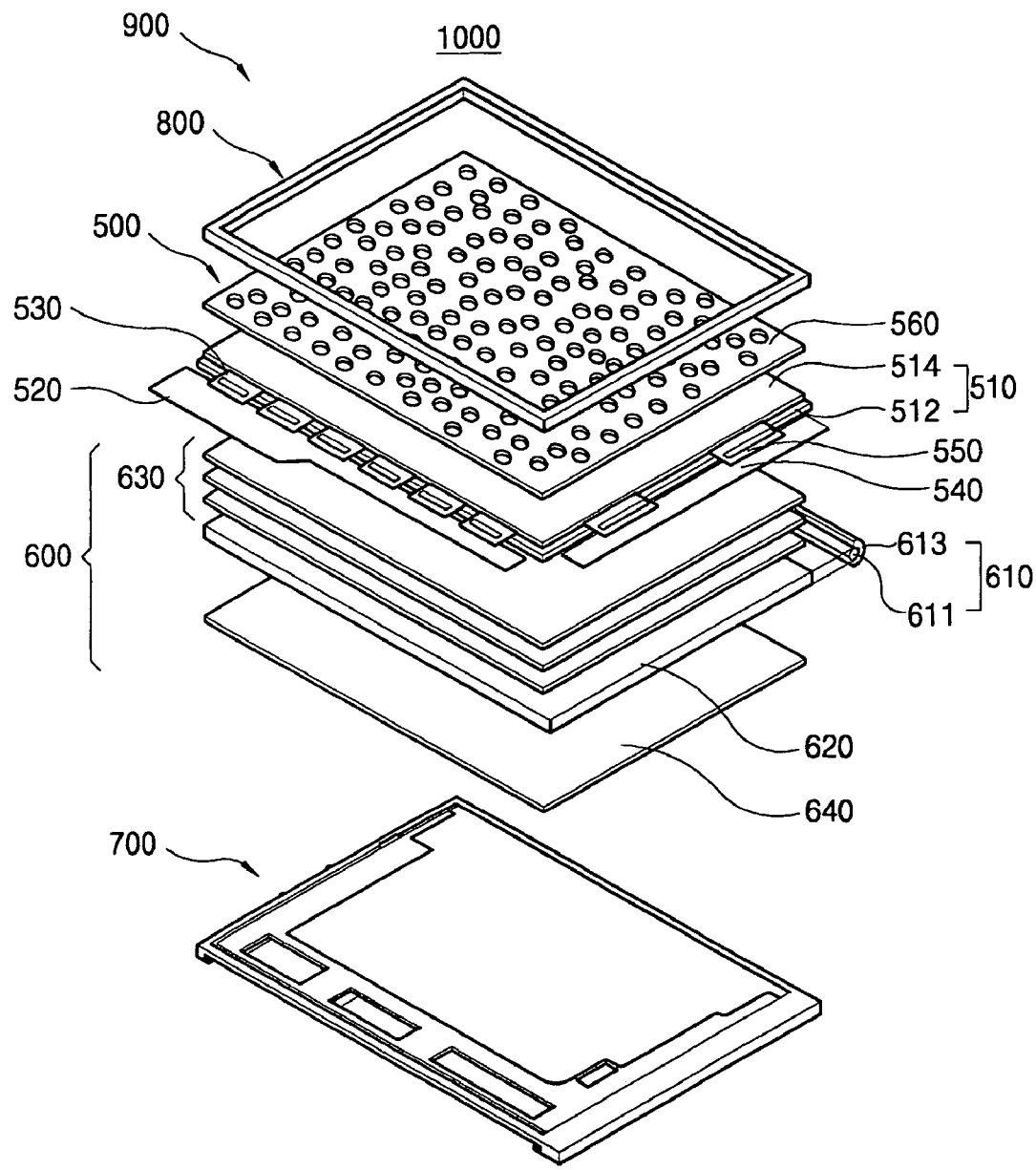
FIG. 2 is an exploded perspective view showing a liquid crystal display device according to one exemplary embodiment of the present invention.
Figure 3:
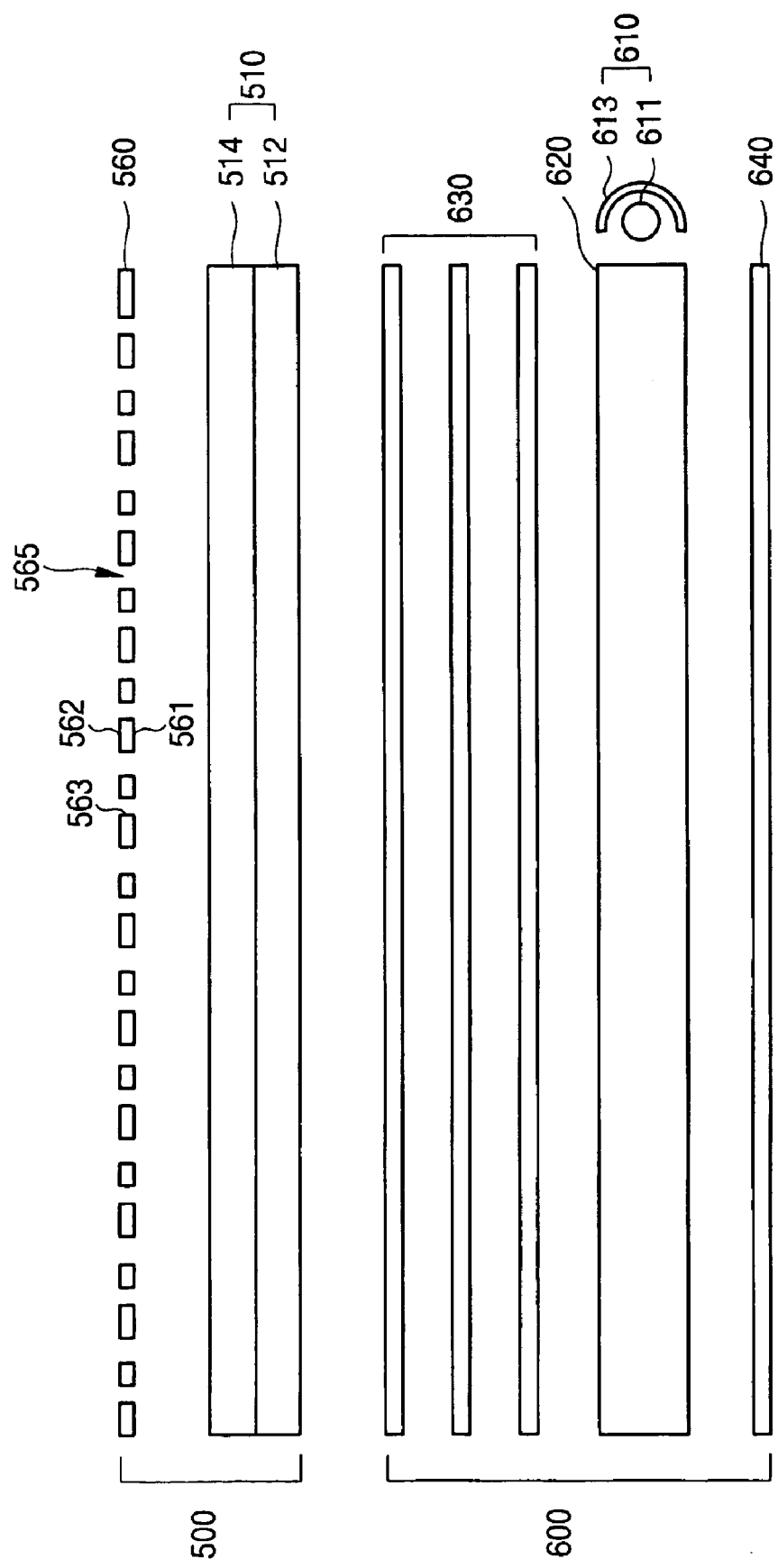
FIG. 3 is a sectional view showing a structure of a liquid crystal display device shown in FIG. 2.

FIG. 2 is an exploded perspective view showing a liquid crystal display device 1000 according to an exemplary first embodiment of the present invention and FIG. 3 is a sectional view of the liquid crystal display device 1000 shown in FIG. 2.

Referring to FIGS. 2 and 3, the liquid crystal display device 1000 includes a backlight unit 600 for generating first light, and a display unit 500. The display unit 500 receives the first light and radiates second light having image information, to thereby display images.

The display unit 500 has a liquid crystal display panel 510 for displaying images, printed circuit boards 520 and 540 for supplying driving signals and image data signals to the liquid crystal display panel 510, and TCPs 530 and 550 disposed between the liquid crystal display panel 510 and the printed circuit boards 520 and 540 so as to electrically connect printed circuit boards 520 and 540 to the liquid crystal display panel 510.

The liquid crystal display panel 510 includes a TFT substrate 512 having TFTs and pixel electrodes, a color filter substrate 514 facing the TFT substrate 512 and having color filters and common electrode, and liquid crystal (not shown) disposed between the TFT substrate 512 and the color filter substrate 514.

The TN liquid crystal, in which a long axis of liquid crystal is continuously twisted at a right angle from the pixel electrode towards the common electrode, is mainly used in the liquid crystal display device.

The TFT substrate 512 includes a plurality of data lines (not shown) extended in a row direction thereof and a plurality of gate lines (not shown) extended in a column direction thereof. In addition, a plurality of TFTs is arranged on the TFT substrate 512 in a matrix shape. Source electrodes of the TFTs are connected to the data lines, and gate electrodes of the TFTs are connected to the gate lines. Drain electrodes of the TFTs are connected to the pixel electrodes.

One end of each data line is coupled to the data-side TCP 530 equipped with a data driver chip, and one end of each gate line is coupled to the gate-side TCP 550 equipped with a gate driver chip.

The data-side TCP 530 is connected to the data-side printed circuit board 520 so as to timely apply image data signal inputted from the data-side printed circuit board 520 to the data lines. In addition, the gate-side TCP 550 is connected to the gate-side printed circuit board 540 so as to apply gate driving signal inputted from the gate-side printed circuit board 540 to the gate lines.

A first porous film 560 is disposed on the liquid crystal display panel 510. A dimension of the first porous film 560 corresponds to that of the liquid crystal lo display panel 510, and the first porous film 560 has a plurality of pores. Inner sidewalls of the first porous film 560 defined by the plurality of pores change a path of the second light, which is exited from the liquid crystal display panel 510 and includes image information, to output a third light providing an expanded viewing angle.

The first porous film 560 includes a first incident surface 561 discontinuously extended in a first direction D1, a first exiting surface 562 opposite to the first incident surface 561, and sidewalls 563 connecting the first incident surface 561 to the first exiting surface 562 and extended in a second direction D2. Hereinafter, the sidewalls 563 are defined as "inner sidewalls" defined by the plurality of pores 565. The first porous film 560 is comprised of a high polymer resin, such as a transparent acryl resin, having a predetermined refractive index.

Although it is not illustrated in the figures, the pores 565 can be formed at the first porous film 560 through various well-known processes. For example, the pores 565 can be formed at the first porous film 560 by using silica particles, by irradiating laser beam into a high polymer film, or by performing a photolithography process. These techniques for fabricating the first porous film 560 are well-known in the art, and will not be further described below.

In addition, the backlight unit 600 includes a light source 610 for generating first light and a light guiding plate 620 for guiding the first light towards the liquid crystal display panel 510.

The light source 610 includes a lamp (lamps) 611 for generating the first light and a lamp reflection plate 613 for covering one side of the lamp 611 to reflect the first light towards the light guiding plate 620.

The light guiding plate 620 is disposed at the other side of the lamp(s) 611, is a hexahedron-shaped plate, and includes an incident surface for receiving the first light, a reflection surface for guiding first light towards the liquid crystal display panel 510, and an exiting surface for outputting the first light towards the liquid crystal display panel 510. Accordingly, the light guiding plate 620 guides the first light towards the liquid crystal display panel 510.

In addition, the backlight unit 600 includes a reflection plate 640 disposed below the light guiding plate 620 to reflect light leaked from the light guiding plate 620 towards the liquid crystal display panel 510, and a plurality of optical sheets 630 for allowing the light outputted from the light guiding plate 620 to have luminance uniformly distributed.

The backlight unit 600 and the display unit 500 having the above structure are sequentially accommodated in a receiving space of a mold frame 700. Then, the backlight unit 600 and the display unit 500 are fixed to the mold frame 700 by a chassis 800 facing the mold frame 700.

Figure 4:
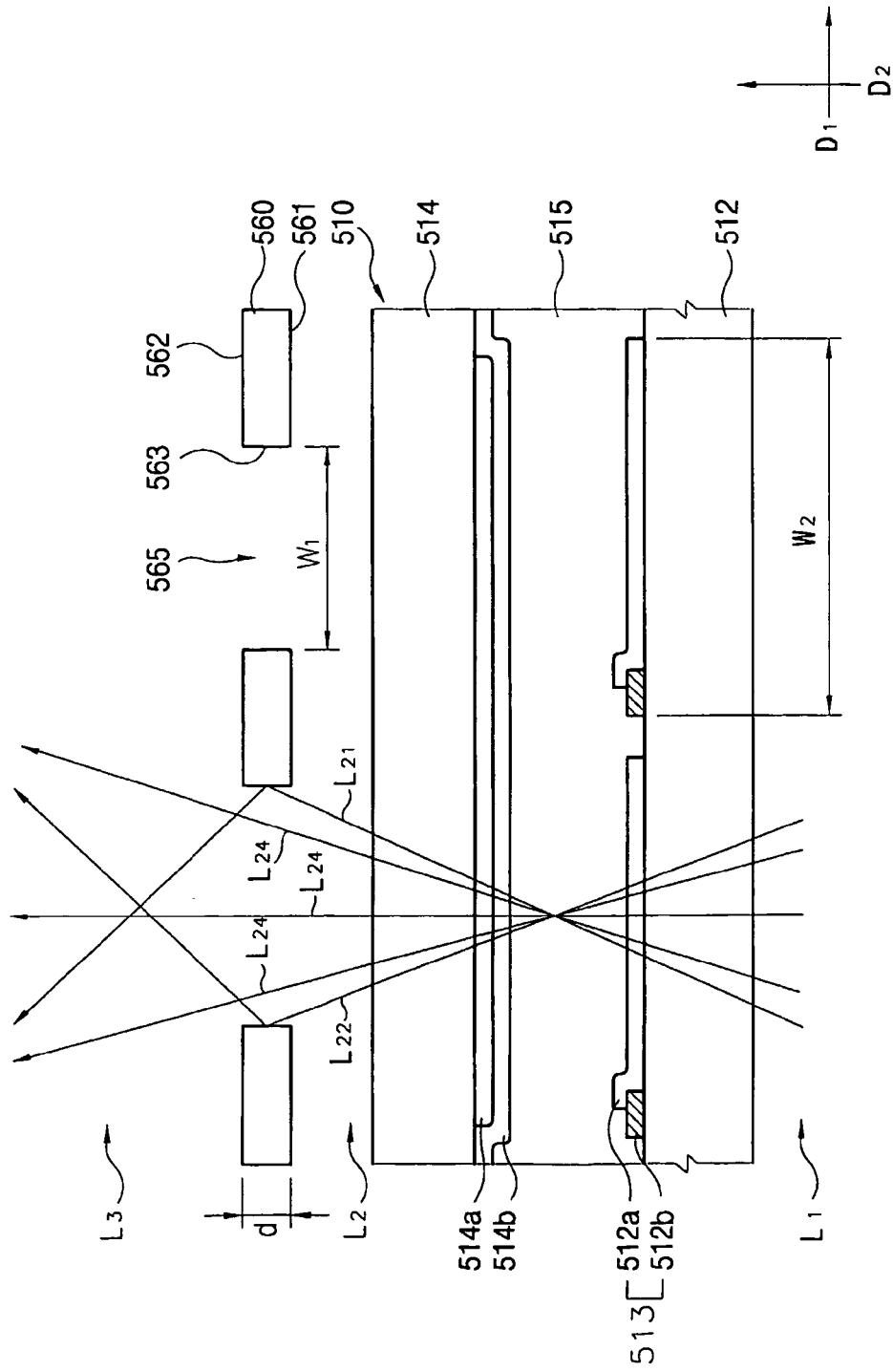
FIGS. 4 and 5 are views showing a light path to be changed by a first porous film.
Figure 5:
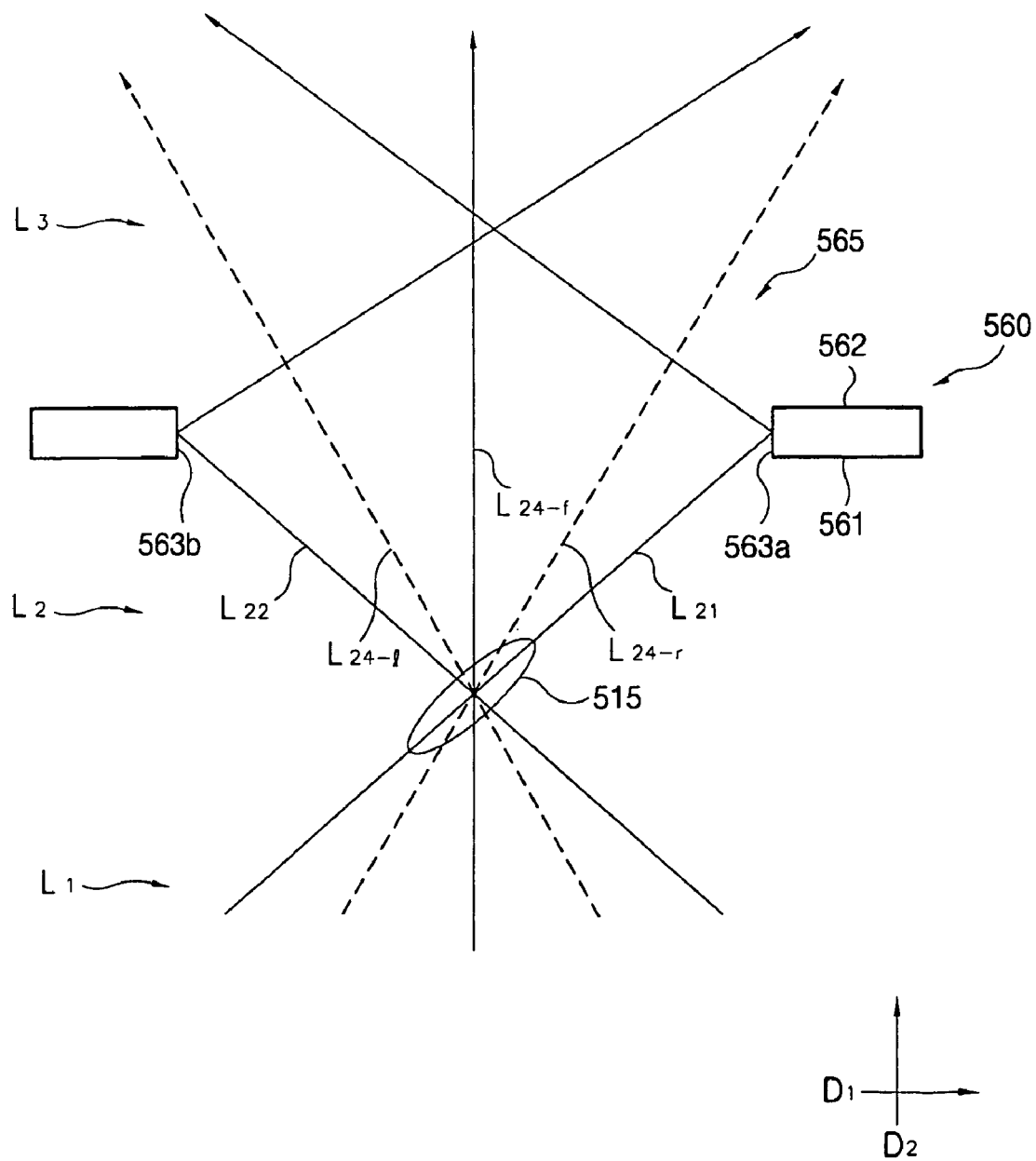

FIGS. 4 and 5 are views showing a light path to be changed by the first porous film.

Referring to FIG. 4, the liquid crystal display panel 510 includes the first porous film 560. The first porous film 560 partially changes the path of the second light exited from the liquid crystal panel 510, and outputs third light providing an expanded viewing angle.

The liquid crystal display panel 510 includes the TFT substrate 512 comprised of a plurality of pixels 513, the color filter substrate 514 having color filters 514a and common electrode 514b, and liquid crystal 515 disposed between the TFT substrate 512 and the color filter substrate 514. Each pixel 513 has a TFT 512a and a pixel electrode 512b.

When voltage is provided between the pixel electrode 512b and the common electrode 514b, an electric field is formed between the pixel electrode 512b and the common electrode 514b. Accordingly, an alignment angle of liquid crystal 515 varies, so that quantity of first light L1 incident into the liquid crystal display panel 510 is adjusted depending on the alignment angle. Therefore, a predetermined quantity of second light L2 is outputted.

The second light L2 exits from the liquid crystal display panel 510, and is incident into the first porous film 560. A first part of the second light L2 is incident into the incident surface 651 of the first porous film 560, a second part of second light L2 is incident into the sidewalls 563 of the first porous film 560, and the remaining of the second light L2 is incident into the pores 565 of the first porous film 560. The sidewalls 565 of the first porous film 560 reflect a first and a second group of light (L21 and L22) of the second light L2, which are incident into the sidewalls 565 of the first porous film 560 and have a first incident angle larger than a critical angle of the first porous film 560.

Although it is not illustrated in the figures, the first porous film 560 refracts a third group of light of the second light L2, which is incident into the incident surface 561 of the first porous film 560 and has a second incident angle smaller than the critical angle of the first porous film 560, to thereby output fourth light having an exiting angle different from the second incident angle. In addition, a remained fourth group of light L24, excepting the first, the second and the third group of light, of the second light L2 is outputted through the pores 565.

A size (w1) of the pores 565 formed in the first porous film 560 is preferably smaller than a size (w2) of the pixel 513 formed on the TFT substrate 512. In addition, a thickness (d) of the first porous film 560 is in a range of about 5 to about 10 μm. It is preferred that the thickness (d) of the first porous film 560 is wide enough such that a sufficient quantity of light of the second light L2, which is exited from the liquid crystal display panel 510, may be incident into the sidewalls 565 of the first porous film 560. However, it is required to limit the thickness (d) of the first porous film 510 so as to provide a liquid crystal display device with a slim structure.

Referring to FIGS. 4 and 5, when voltage is provided between the pixel electrode 512b of the TFT substrate 512 and the common electrode 514b of the color filter substrate 514, an electric field is formed between the pixel electrode 512b and the common electrode 514b, and a long axis of liquid crystal 515 is tilted at a predetermined angle with respect to the first direction D1. When the first light L1 is provided to the liquid crystal display panel 510, the quantity of first light L1 incident into the liquid crystal display panel 510 is adjusted by the tilted liquid crystal, to thereby output the second light L2 including image information.

As shown in FIG. 5, if the liquid crystal 515 is tilted toward the first direction D1, the first group of light L21 passed through the long axis of liquid crystal 515 is reflected by a first sidewall 563a and is exited from the first sidewall 563a, and the second group of light L22 passed through a short axis of liquid crystal 515 is reflected by a second sidewall 563b opposite to the first sidewall 563a and is exited from the second sidewall 563.

In addition, front-side light L24-f of the fourth group of light L24, which penetrates though the pores 565, passes through the liquid crystal 515 in a direction parallel to the first direction D1 to be exited from the liquid crystal 515. Right-side light L24-r of the fourth group of light L24 passes through liquid crystal 515 in a direction between the second direction D2 and a long-axis direction to be exited from the liquid crystal 515, and left-side light L24-l of the fourth group of light L24 is passes through the liquid crystal 515 in a direction between the second direction D2 and a short-axis direction to be exited from the liquid crystal 515.

Since the first group of light L21 passes through the long axis of liquid crystal 515, the first group of light L21 loses a relatively large quantity of light while passing through liquid crystal 515 compared with the second group of light L22. On the contrary, since the second group of light L22 passes through the short axis of liquid crystal 515, the second group of light L22 loses a relatively small quantity of light while passing through liquid crystal 515 compared with the first group of light L21. Therefore, the first group of light L21 of the second light L2 has a quantity of light less than that of the second group of light L22 of the second light L2.

The first group of light L21 is reflected by the first sidewall 563a so that the light path thereof is changed in parallel to the short axis of liquid crystal 515. The second group of light L22 is reflected by the second sidewall 563b so that the light path thereof is changed in parallel to the long axis of liquid crystal 515. On the other hand, the front-side light L24-f, the left-side light L24-l and the right-side light L24-r of the fourth group of light L24 pass through the pores 565 of the first porous film 560, without making contact with the first porous film 560.

Accordingly, the first group of light L21 compensates for luminance of the left-side light L24-l tilted in a left direction with respect to the second direction D2, to thereby exit light having uniform luminance. In addition, the second group of light L22 compensates for luminance of the right-side light L24-r tilted in a right direction with respect to the second direction D2, to thereby exit light having uniform luminance. That is, the first porous film 560 allows the second light L2, which represents different luminance characteristic depending on viewing points thereof, to be exited as third light L3 to provide expanded viewing angle. Therefore, the first porous film 560 expands the viewing angle of the liquid crystal display device 1000 and prevents the "gray scale inversion", which occurs when the viewing angle exceeds a predetermined level.

In addition, since the porous film 560 allows the front-side light L24-f to directly pass through the pores 565, luminance of the liquid crystal display device 1000 will be improved when viewed from a front of the liquid crystal display device 1000.

FIGS. 6A to 6E are views showing the plurality of pores formed in the first porous film.

Figure 6A:
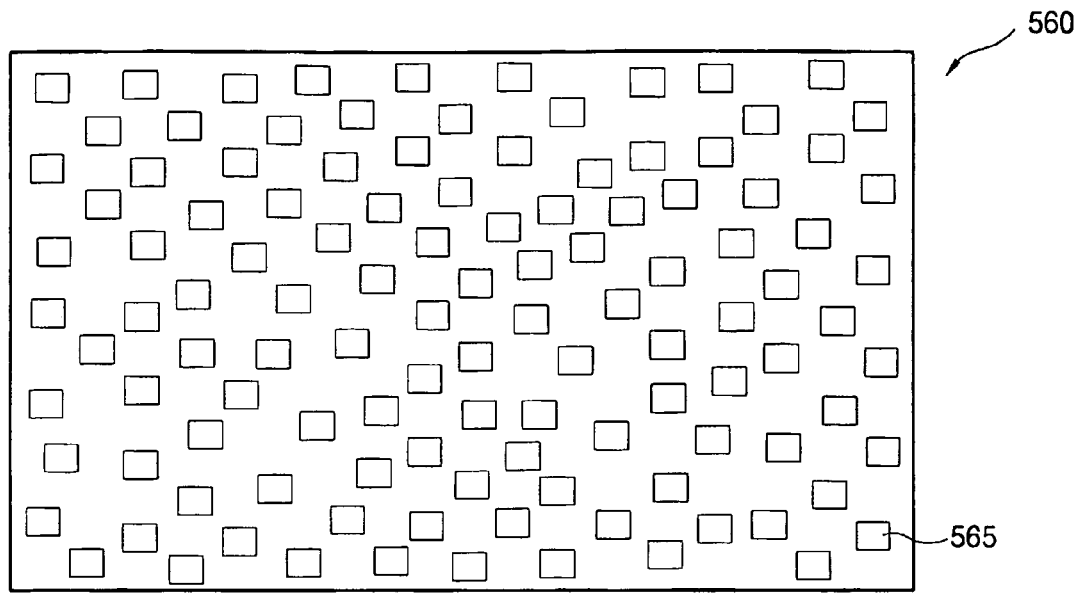
FIGS. 6A to 6E are views showing a plurality of pores formed in a first porous film.

Referring to FIG. 6A, the first porous film 560 includes a plurality of plural pores 565 having a regular square shape. Since the pores 565 have the regular square shape, front, rear, left, and right sidewalls (not shown) of the first porous film 560 have equal sectional area. Thus, the first porous film 560 can compensate for luminance in front, rear, left, and right directions of the pores 565.

Figure 6B:
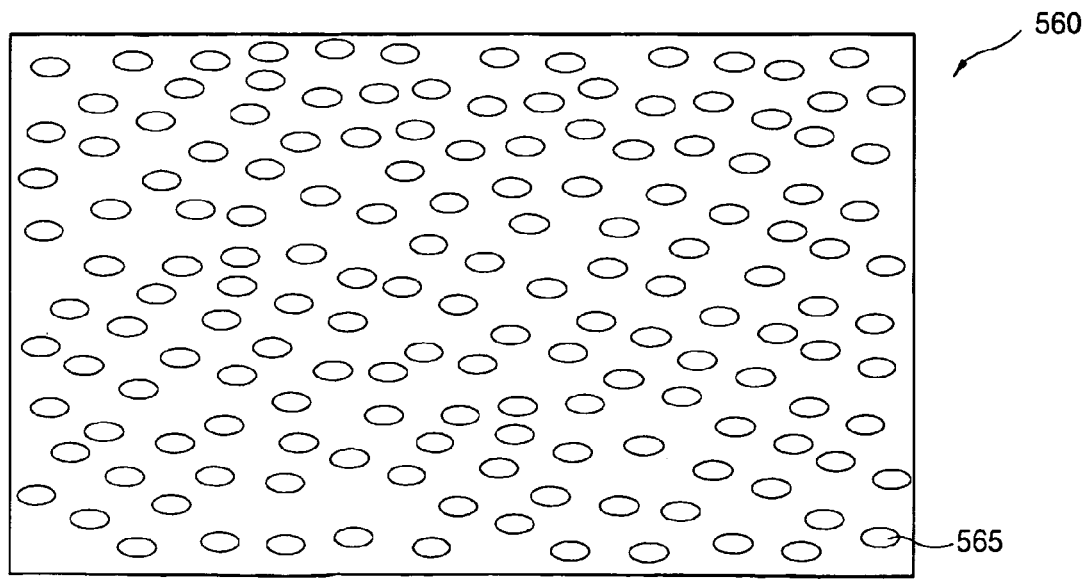
Figure 6C:
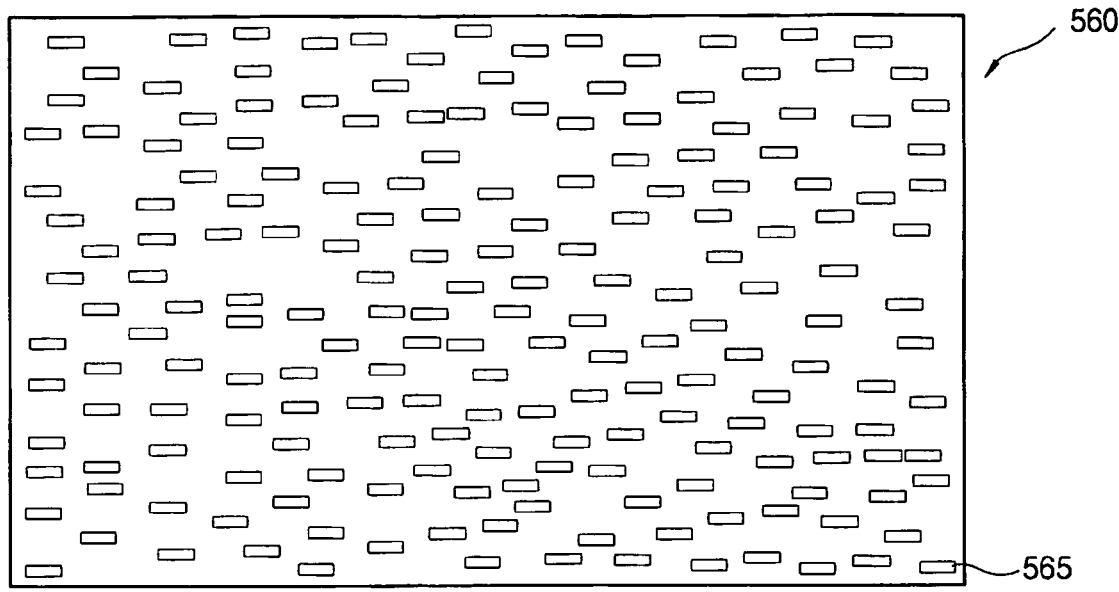

On the other hand, referring to FIGS. 6B and 6C, the first porous film 560 includes a plurality of plural pores 565 having a horizontally elongated rectangular shape or a horizontally elongated oval shape. Since the pores 565 have the horizontally elongated rectangular shape or the horizontally elongated oval shape, sectional areas of the front and rear sidewalls (not shown) of the first porous film 560 are larger than sectional areas of the left and right sidewalls of the first porous film 560. Thus, the first porous film 560 can better compensate for luminance in the front and rear directions of the pores 565 compared with in the left and right directions of the pores 565.

Figure 6D:
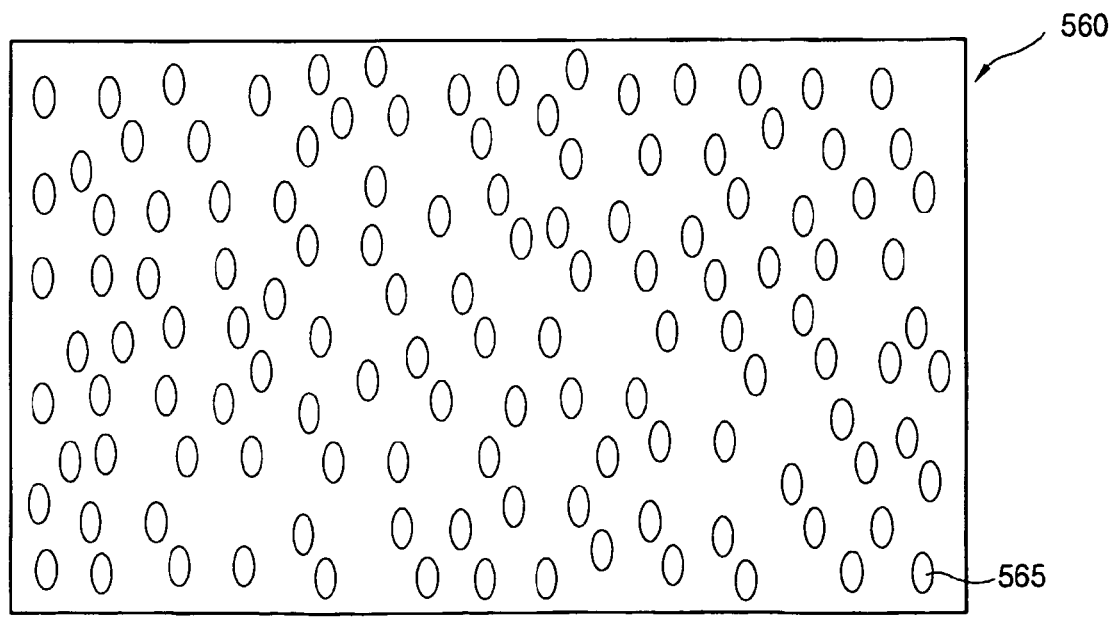
Figure 6E:
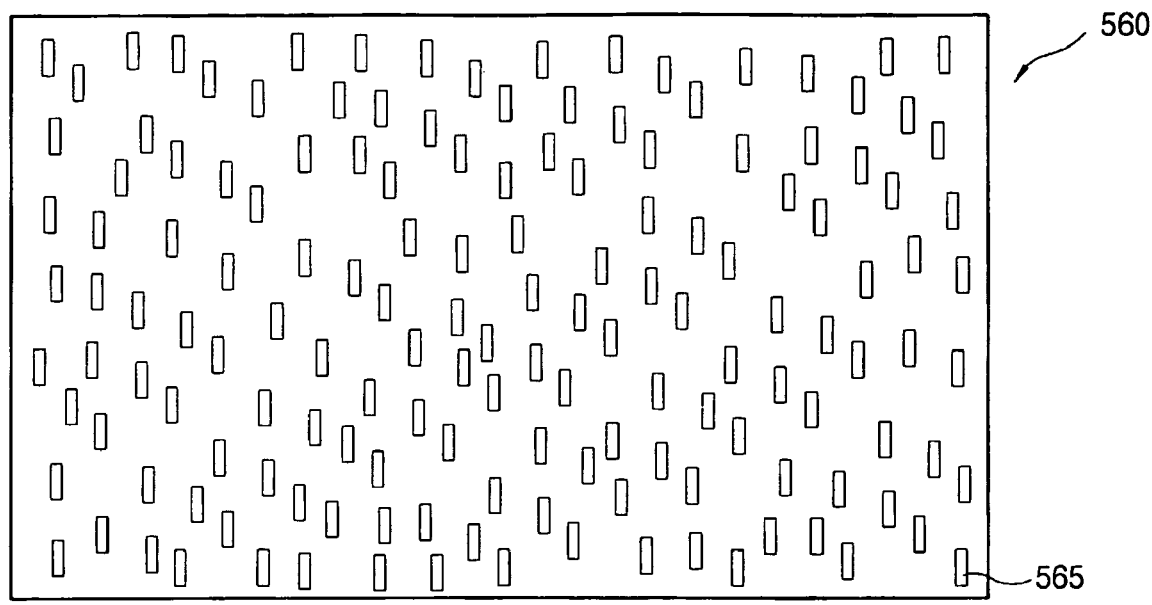

In addition, referring to FIGS. 6D and 6E, the first porous film 560 includes a plurality of plural pores 565 having a vertically elongated rectangular shape or a vertically elongated oval shape. Since the pores 565 has the vertically elongated rectangular shape or the vertically elongated oval shape, sectional areas of the left and right sidewalls (not shown) of the first porous film 560 are larger than sectional areas of the front and rear sidewalls of the first porous film 560. Thus, the first porous film 560 can better compensate for luminance in left and right directions of the pores 565 compared with in the front and left directions of the pores 565.

The present invention has been described with reference to the first porous film 560 having a single layer structure. Hereinafter, the present invention will be described with reference to second and third porous films having multi-layer structure.

Figure 7B:
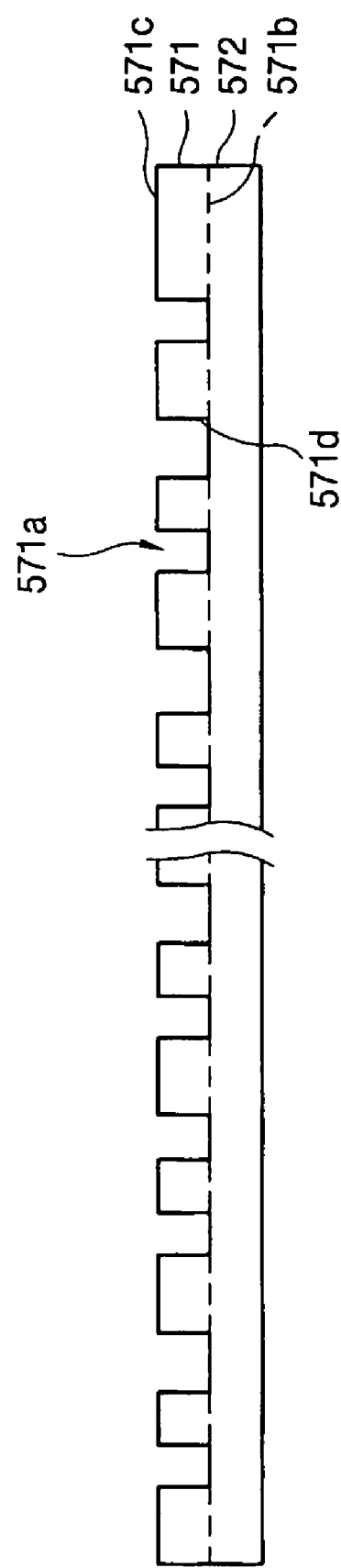

FIGS. 7A and 7B are views showing the second porous film according to another exemplary embodiment of the present invention.

Referring to FIG. 7A and 7B, the second porous film 570 includes a porous layer 571 having a plurality of pores 571, and a supporting layer 572 for supporting an incident surface 571b of the second porous layer 571. The supporting layer 572 is integrally formed with the second porous layer 571.

The second porous layer 571 has the incident surface 571 discontinuously extended in the first direction D1 parallel to an upper surface of the supporting layer 572, an exiting surface 571c opposite to the incident surface 571, and a plurality of sidewalls 571d connecting the incident surface 571b to the exiting surface 571c and extended in the second direction D2 perpendicular to the upper surface of the supporting layer 572.

Figure 8B:
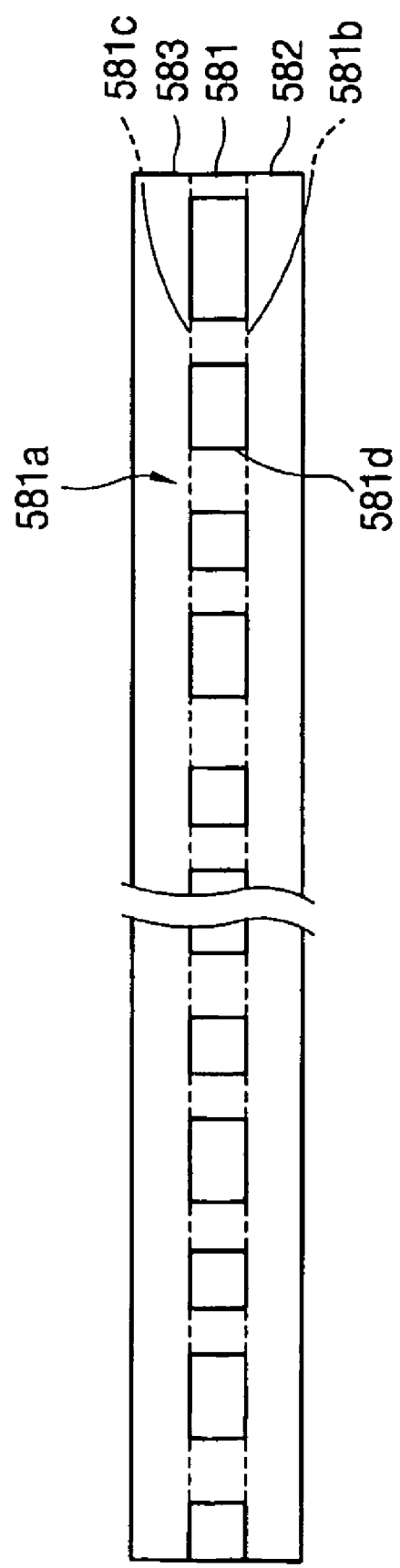

FIGS. 8A and 8B are views showing the third porous film according to another exemplary embodiment of the present invention.

Referring to FIG. 8A and 8B, the third porous film 580 includes a porous layer 581 having a plurality of pores 581, a first supporting layer 582 for supporting an incident surface 581b of the third porous layer 581, and a second supporting layer 583 for supporting an exiting surface 581c of the porous layer 581. The first and second supporting layers 582 and 583 are integrally formed with the porous layer 581.

The third porous layer 581 has the incident surface 581a discontinuously extended in the first direction D1 parallel to upper surfaces of the first and second supporting layers 582 and 583, the exiting surface 581c opposite to the incident surface 581, and a plurality of sidewalls 581d connecting the incident surface 581b to the exiting surface 581c and extended in the second direction D2 perpendicular to the upper surfaces of the first and second supporting layers 582 and 583.

Hereinafter, a second embodiment of the present invention will be described, in which the first, second and third porous films 560, 570 and 580 are not provided in the liquid crystal display device 1000 as separate elements, but integrally formed with a polarizing plate, which is installed at an upper or a lower portion of the liquid crystal display panel 510 to perform a polarizing function.

Figure 9:
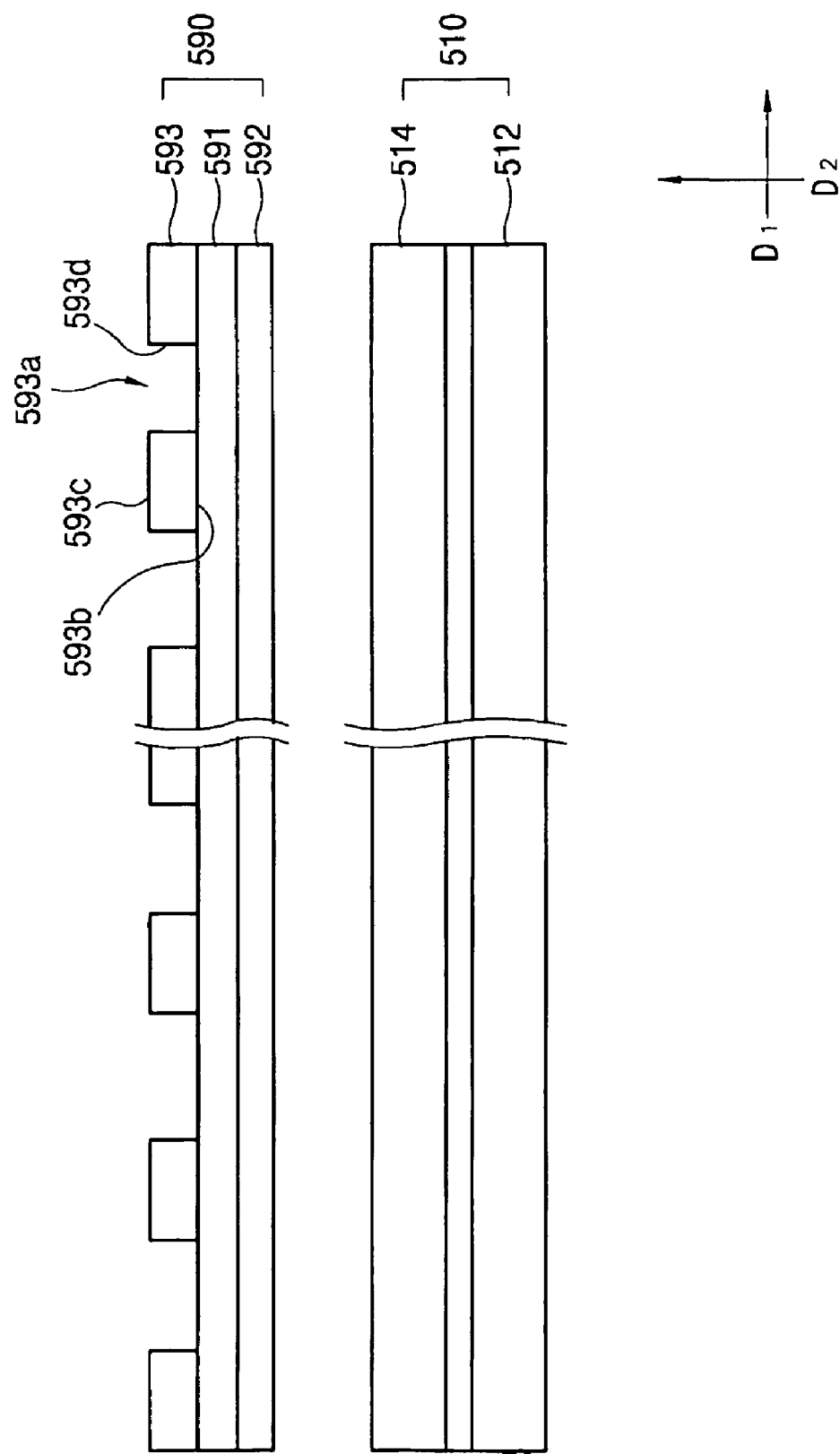
FIGS. 9 and 10 are views showing a structure of a polarizing plate of a liquid crystal display device according to an exemplary second embodiment of the present invention.
Figure 10:
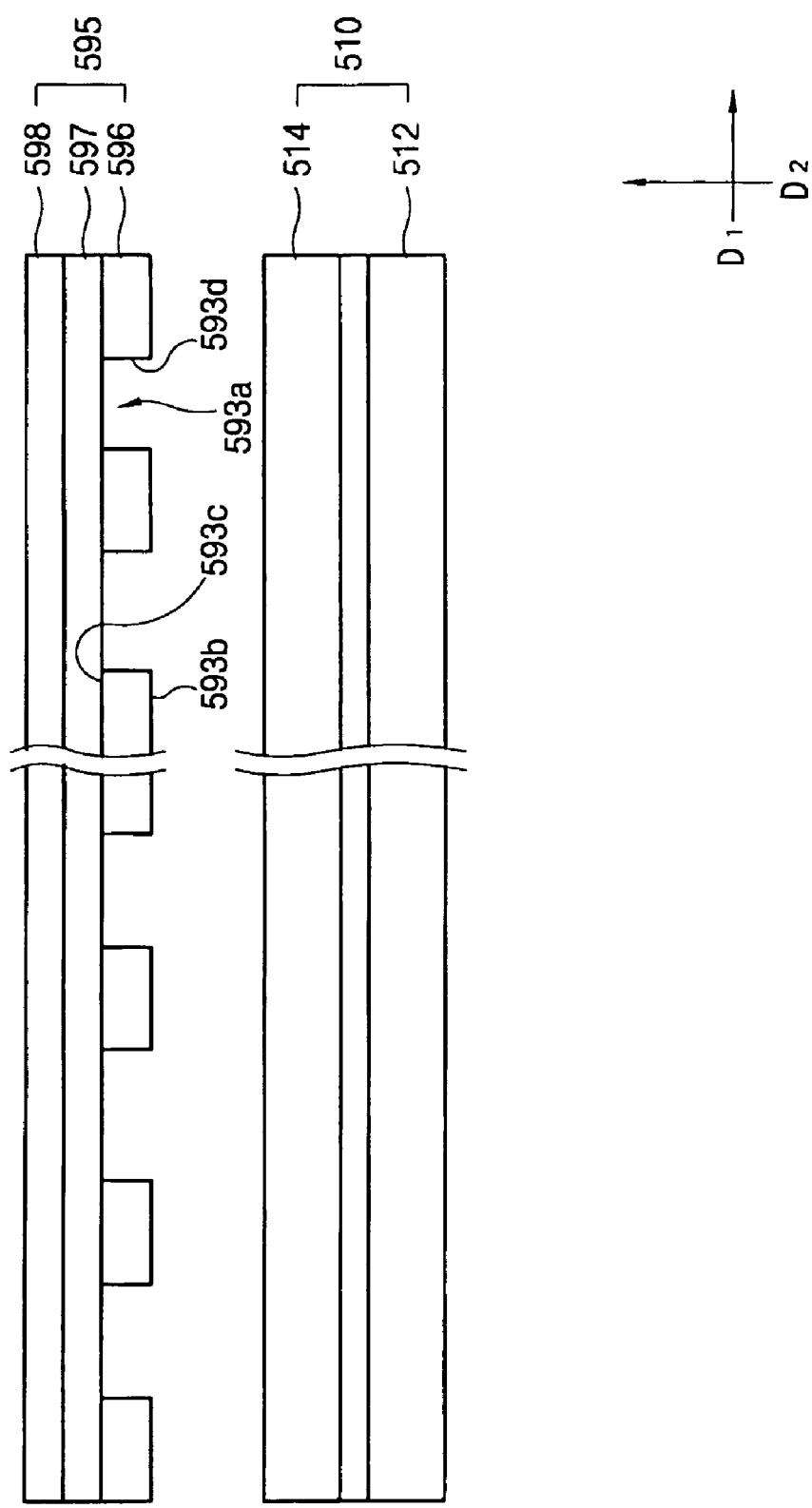

FIGS. 9 and 10 are views showing a structure of the polarizing plate of the liquid crystal display device according to the exemplary second embodiment of the present invention.

Referring to FIG. 9, a first polarizing plate 590 includes a polarizing layer 591 for outputting third light (not shown) by polarizing second light (not shown), which is exited from the liquid crystal panel 510 and includes image information, a supporting layer 592 disposed between the polarizing layer 591 and the liquid crystal display device 510 so as to support the polarizing layer 591, and a porous layer 593 having a plurality of pores and being disposed on the polarizing layer 591 so as to output fourth light (not shown) providing an expanded viewing angle by partially changing a path of the third light polarized by the polarizing layer 591.

Generally, the polarizing layer 591 is formed by absorbing iodine or dichromatic dyes into polyvinyl alcohol (PVA) layer, which is extended in a third direction parallel to the upper surface of the liquid crystal display panel 510.

Since iodine molecules and dye molecules have dichromatic property, they absorb the light vibrating in parallel to the third direction and transmit the light vibrating perpendicular to the third direction. Accordingly, the polarizing layer 591 absorbs light components vibrating in the third direction and transmits light components vibrating in a fourth direction, which is parallel to the upper surface of the liquid crystal display panel 510 and perpendicular to the third direction.

The supporting layer 592 is comprised of triacetate cellulose (hereinafter, referred to TAC) resin having a superior endurance, and supports and protects the polarizing layer 591.

The porous layer 593 has an incident surface 593b discontinuously extended in the first direction D1 parallel to an upper surface of the polarizing layer 591, an exiting surface 593c opposite to the incident surface 593b, and a plurality of sidewalls 593d connecting the incident surface 593b to the exiting surface 593c and extended in the second direction D2 perpendicular to the upper surface of the polarizing layer 591. Accordingly, the porous layer 593 outputs fourth light to provide expanded viewing angle by partially changing the path of the third light exited from the polarizing layer 591 through the sidewall 593d.

The porous layer 593, like the supporting layer 592, includes TAC resin having a superior endurance, and supports and protects the polarizing layer 591.

Referring to FIG. 10, a second polarizing plate 595 includes a porous layer 596, a polarizing layer 597 and a supporting layer 598. The porous layer 596 has a plurality of pores and outputs third light (not shown) to provide expanded viewing angle by partially changing a path of second light (not shown) exited from the liquid crystal display panel 510. The polarizing layer 597 is disposed on the porous layer 596 to polarize the third light. The supporting layer 598 is disposed on the polarizing layer 597 and supports the polarizing layer 597.

The porous layer 596 has an incident surface 596b discontinuously extended in the first direction D1 parallel to an upper surface of the polarizing layer 597, an exiting surface 596c opposite to the incident surface 596b, and a plurality of sidewalls 596d connecting the incident surface 596b to the exiting surface 596c and extended in the second direction D2 perpendicular to the upper surface of the polarizing layer 597.

Accordingly, the porous layer 596 outputs third light to provide expanded viewing angle by partially changing the path of a polarized second light exited from the liquid crystal display panel 510 through the sidewall 596d.

<Simulation of Gray Scale Inversion According to Variation of Viewing Angles>

Hereinafter, a first porous film having a plurality of pores with a size about 5 µm is used in sample 1 so as to measure luminance of the liquid crystal display device, and a first porous film having a plurality of pores with a size about 2 µm is used in sample 2 so as to measure luminance of the liquid crystal display device. In addition, the first porous film is not used in comparative sample 1.

Figure 11A:
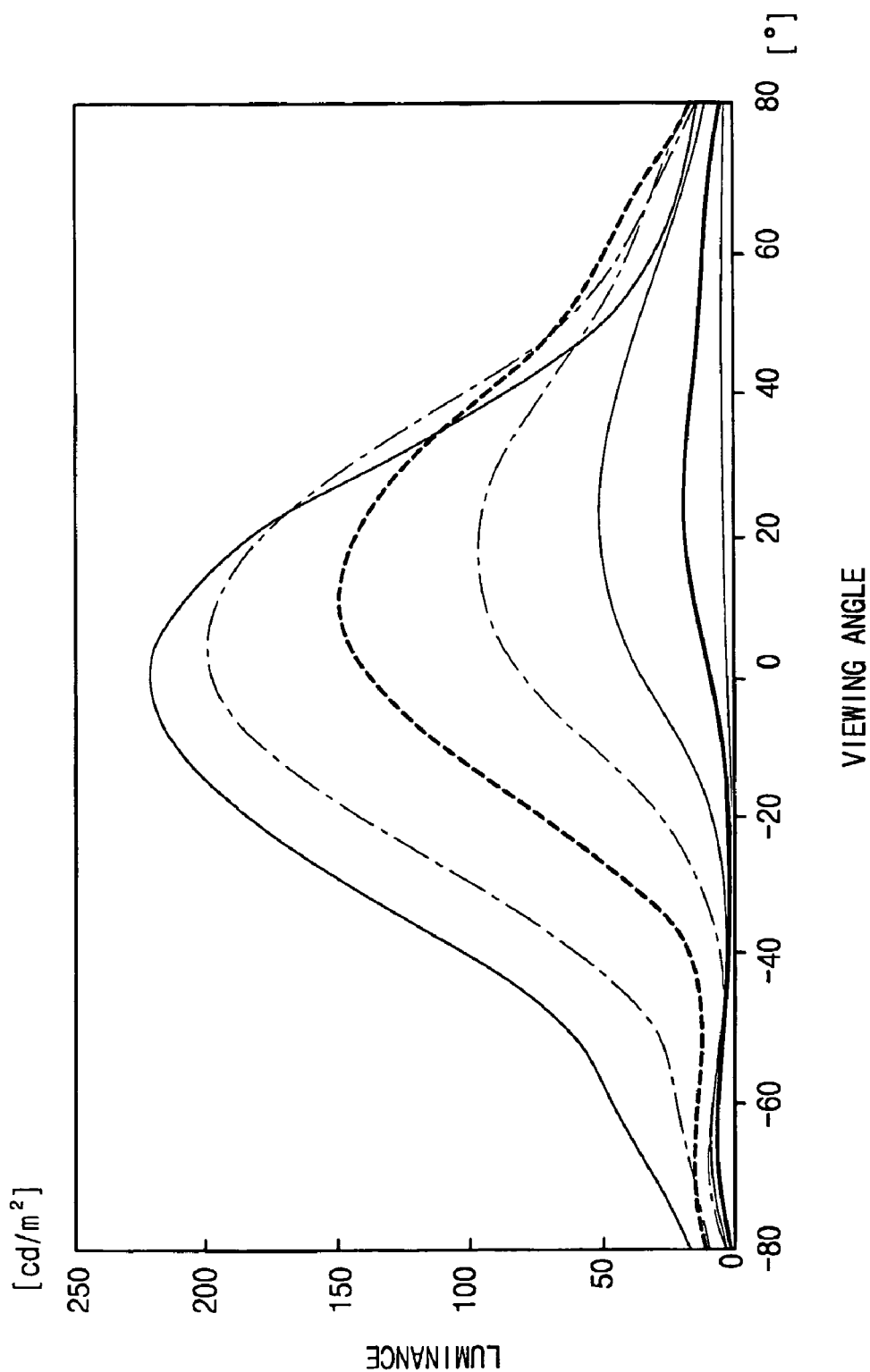
Figure 11B:
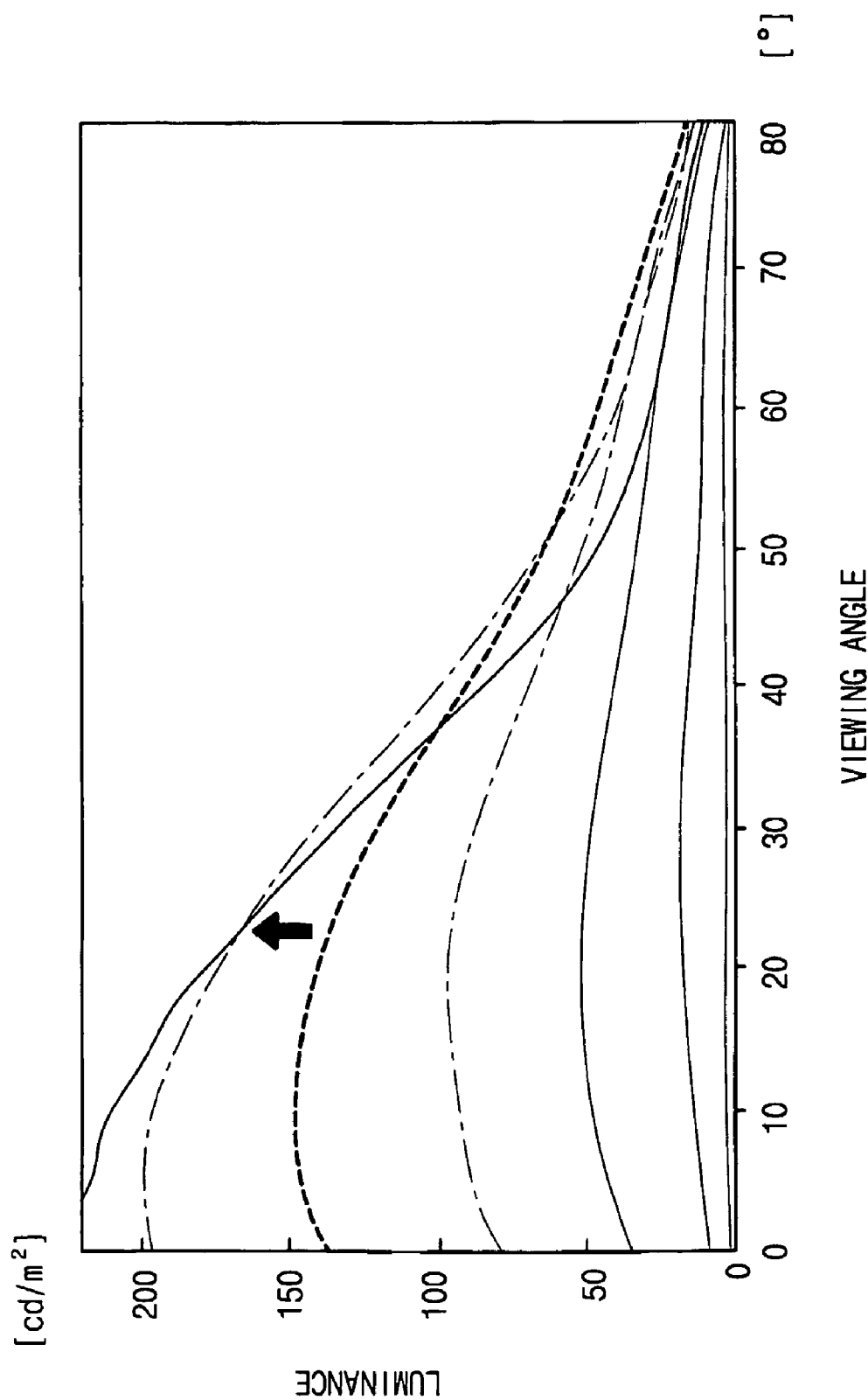
Figure 12B:
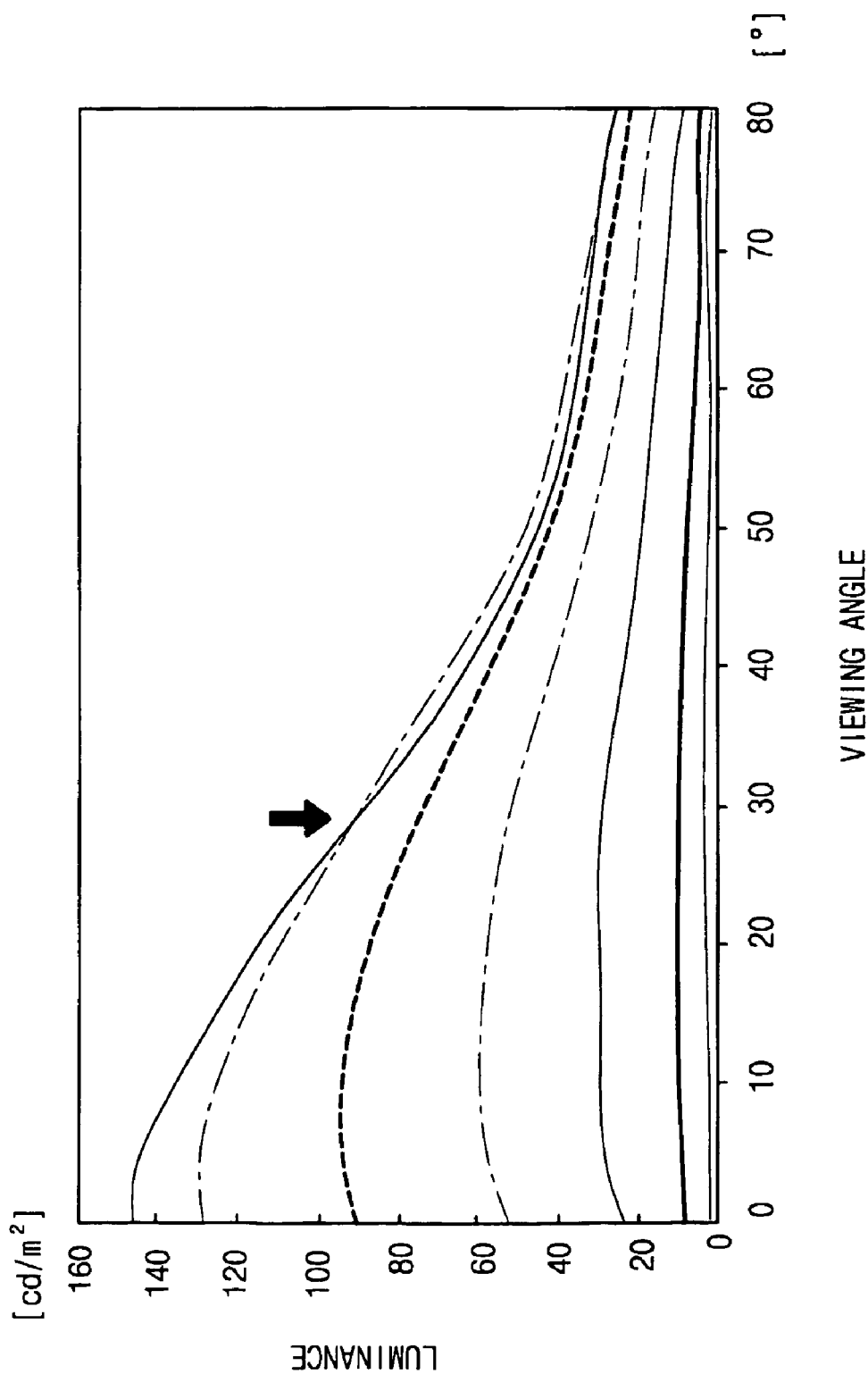
Figure 13A:
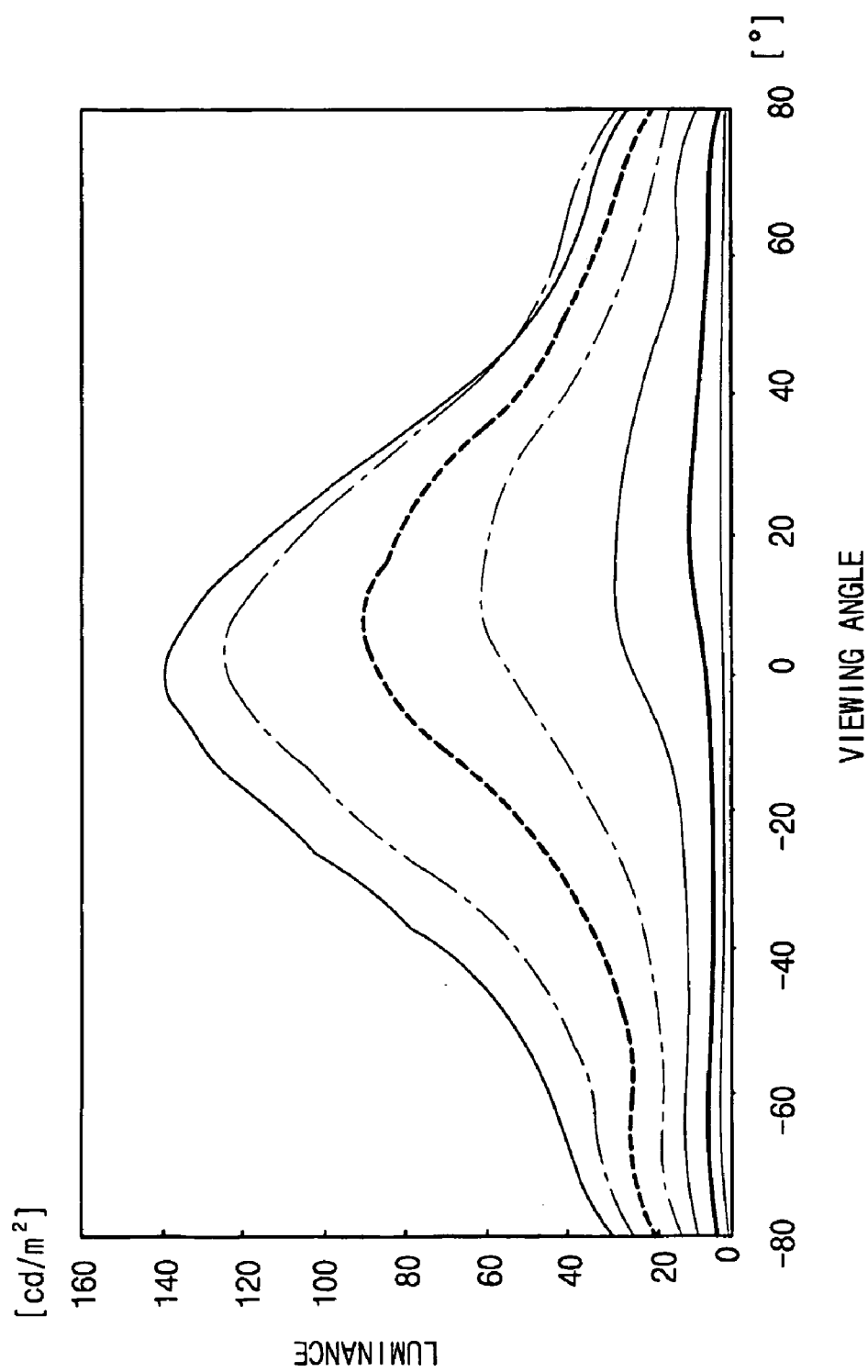
FIGS. 13A to 13C are graphs showing luminance variation according to viewing angles obtained by using sample 2.
Figure 13B:
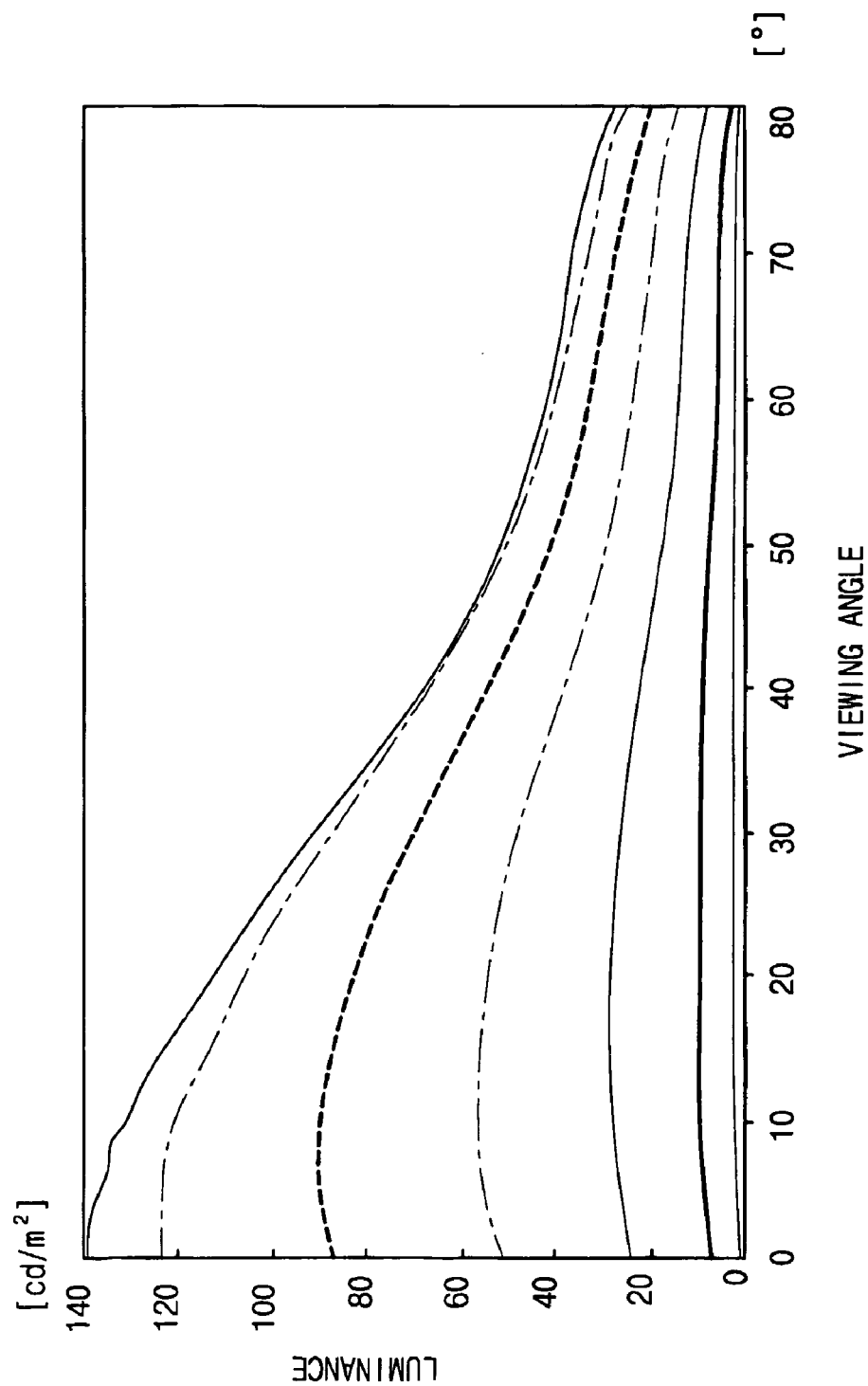
Figure 13C:
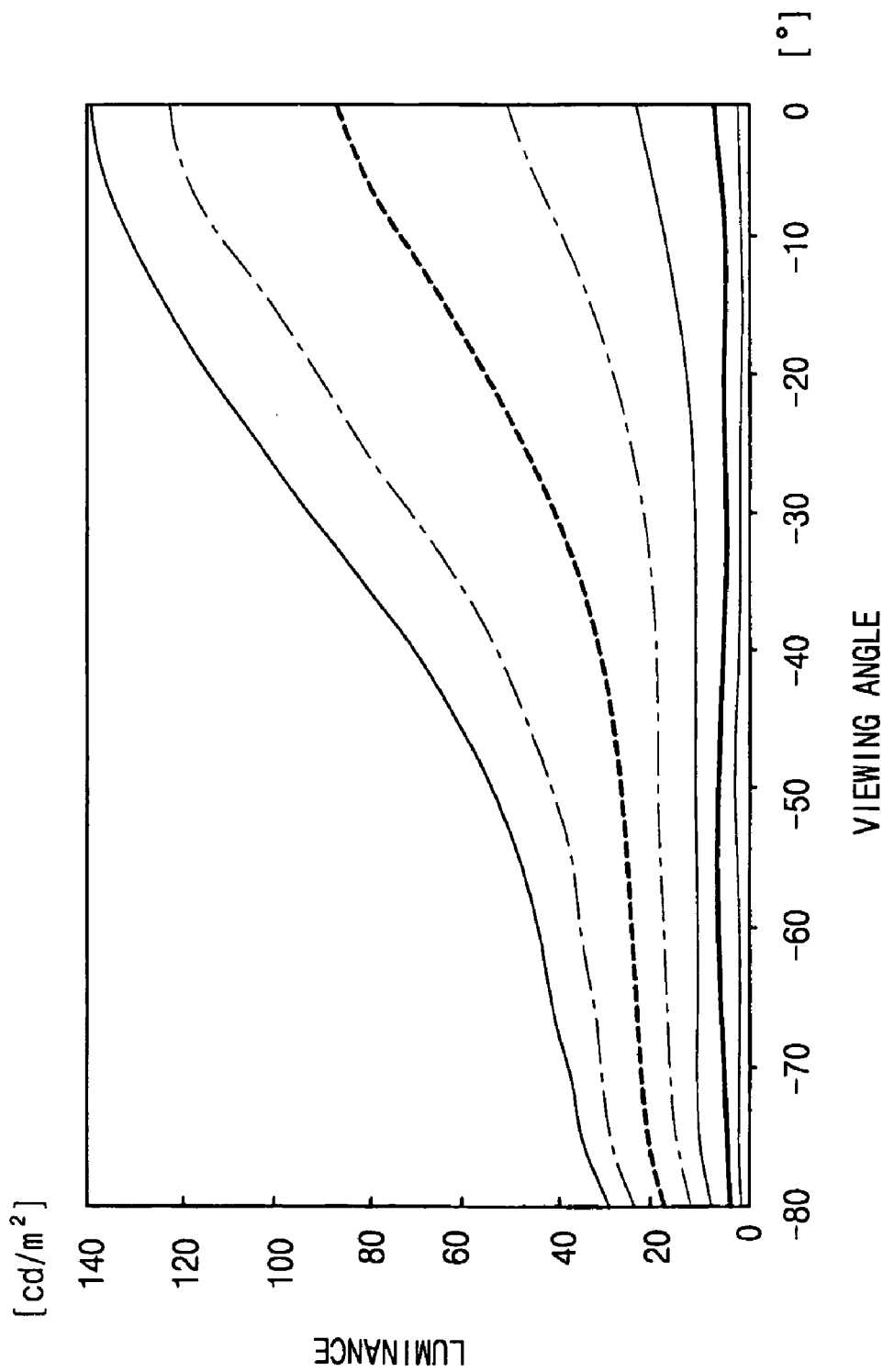

FIGS. 11A to 11C are graphs showing luminance variation according to viewing angles obtained by using comparative sample 1, FIGS. 12A to 12C are graphs showing luminance variation according to viewing angles obtained by using sample 1, and FIGS. 13A to 13C are graphs showing luminance variation according to viewing angles obtained by using sample 2. Each curve of each graph shown in FIGS. 11A to 13C represents one of 8-gray scales made by dividing 64-gray scales into 8-gray scales.

In detail, FIGS. 11A, 12A and 13A represent luminance variation depending on viewing angles varying along a upper and lower direction of a screen of the liquid crystal display panel. FIGS. 11B, 12B and 13B are enlarged views showing luminance variation at upper portions of the curves in FIGS. 11A, 12A and 13A, respectively. FIGS. 11C, 12C and 13C are enlarged views showing luminance variation at lower portions of the curves in FIGS. 11A, 12A and 13A, respectively. In FIGS. 11A to 13C, an x-axis represents a viewing angle (°) and a y-axis represents luminance (cd/m$^2$).

Referring to FIGS. 11A to 11C, luminance does not increase although each gray scale becomes higher, when the first porous film is not used. In addition, a lower gray scale has luminance higher than luminance of a higher gray scale. That is, the "gray scale inversion" occurs at upper and lower portions when the viewing angles are about 24° and −44°, respectively.

On the contrary, referring to FIGS. 12A to 12C, when the first porous having a plurality of pores with a size about 5 µm is used, a satisfactory viewing angle characteristic can be achieved. That is, luminance increases according as each gray scale becomes higher. In detail, the "gray scale inversion" just occurs at the upper portion of the curve only when the viewing angle is about 28°, the "gray scale inversion" does not occur at the lower portion of the curve. In addition, the gray scale inversion is reduced in FIGS. 12A to 12C using sample 1 compared with in FIGS. 11A to 11C using comparative sample 1.

In addition, referring to FIGS. 13A to 13C, when the first porous having a plurality of pores with a size about 2 µm is used, a satisfactory viewing angle characteristic can be achieved. That is, luminance increases according as each gray scale becomes higher. In detail, the "gray scale inversion" does not occur at the upper portion of the curve up to the viewing angle of about 80°. In addition, the "gray scale inversion" does not occur at the lower portion of the curve down to the viewing angle of −80°. Thus, the gray scale inversion is reduced in FIGS. 13A to 13C using sample 2 compared with in FIGS. 11A to 11C using comparative sample 1.

Figure 14:
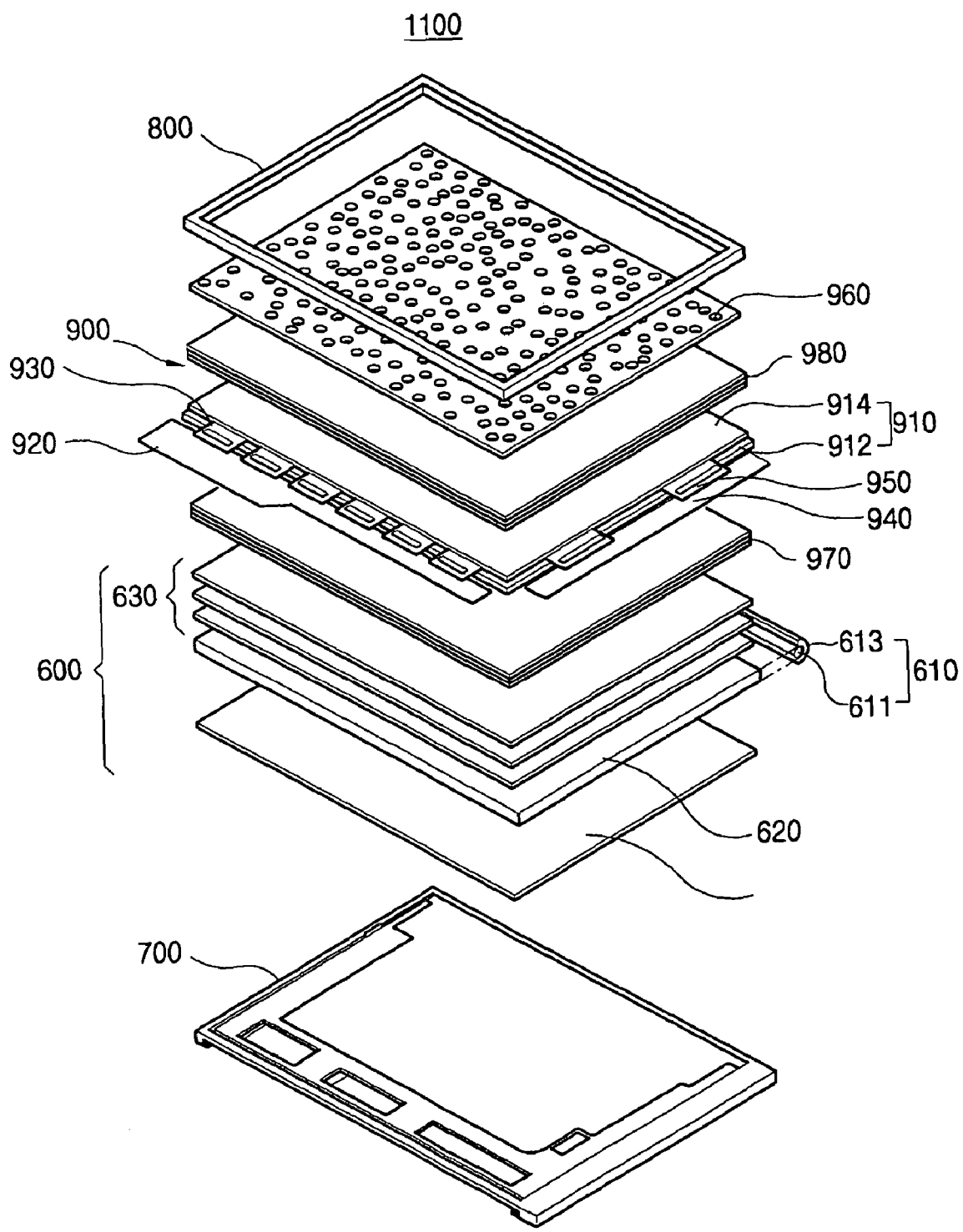
FIG. 14 is an exploded perspective view showing a liquid crystal display device according to an exemplary third embodiment of the present invention.
Figure 15:
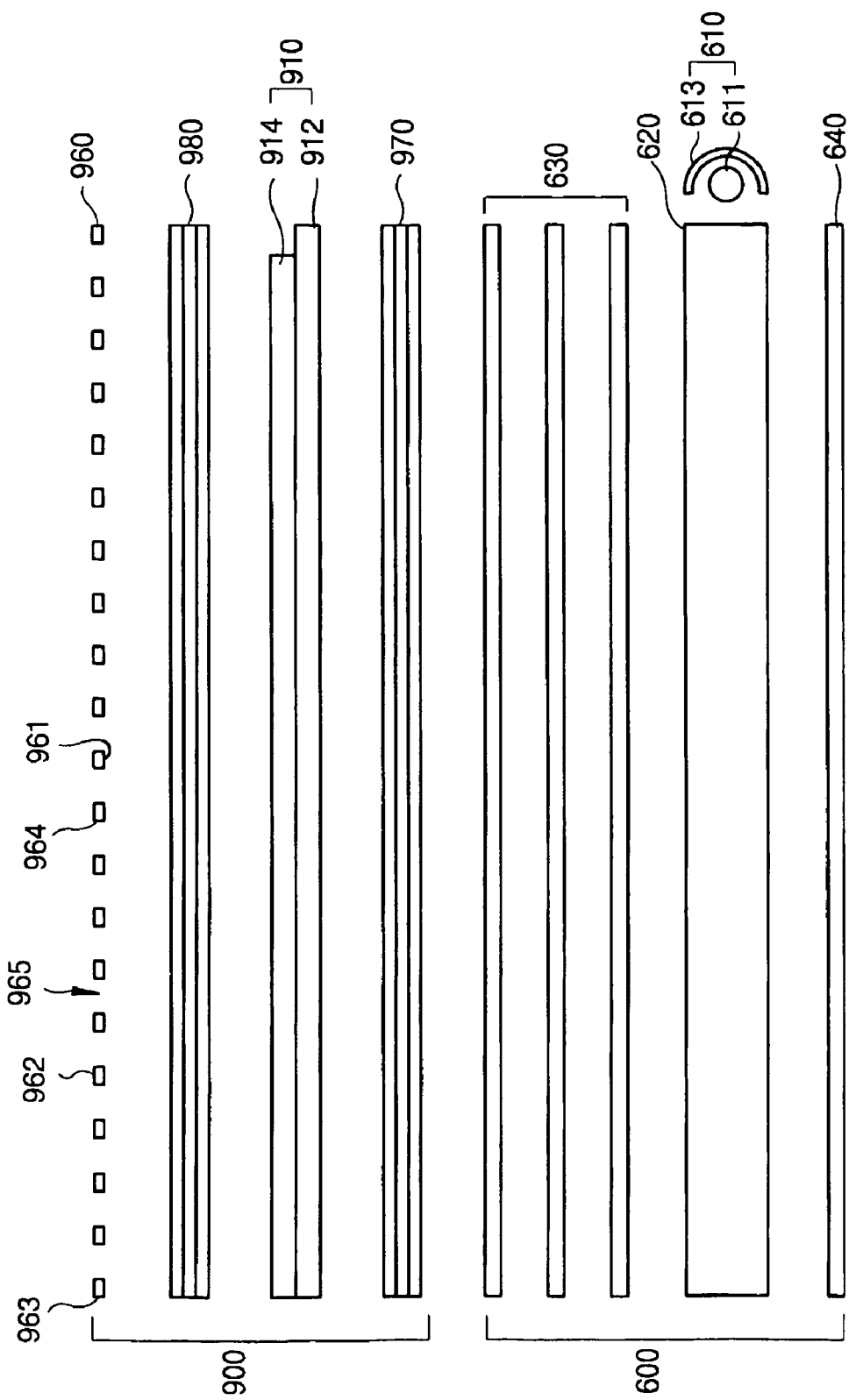
FIG. 15 is a sectional view showing a liquid crystal display device shown in FIG. 14.

FIG. 14 is an exploded perspective view showing a liquid crystal display device according to an exemplary third embodiment of the present invention and FIG. 15 is a sectional view showing a liquid crystal display device shown in FIG. 14.

Referring to FIGS. 14 and 15, the liquid crystal display device 1100 according to the exemplary third embodiment of the present invention includes a backlight unit 600 for generating first light, and a display unit 900 for displaying images.

The display unit 900 has a liquid crystal display panel 910 for displaying images, a lower polarizing plate 970 disposed below the liquid crystal display panel 910, an upper polarizing plate 980 disposed above the liquid crystal display panel 910, and a porous film 960 disposed on the upper polarizing panel 980.

The liquid crystal display panel 910 includes a TFT substrate 912, a color filter substrate 914 and liquid crystal (not shown). The TFT substrate 912 includes TFTs (not shown), pixel electrodes (not shown) and a first alignment layer (not shown). The color filter substrate 914 is opposite to the TFT substrate 912, and has color filters (not shown), common electrode (not shown) and a second alignment layer (not shown). Liquid crystal is disposed between the TFT substrate 912 and the color filter substrate 914. TN liquid crystal, in which a long axis of liquid crystal is continuously twisted at a right angle from the pixel electrode towards the common electrode, is mainly employed in the liquid crystal display device.

The lower polarizing plate 970 polarizes first light incident from the backlight unit 600, and provides the polarized first light to the liquid crystal display panel 910. The polarized first light is incident into the liquid crystal display panel 910, and is deflected in a predetermined direction while passing through the twisted liquid crystal, which has an varied aligning angle depending on an electric field applied to the liquid crystal, so that second light having image information is outputted.

The second light is incident into the upper polarizing plate 980. The upper polarizing plate 980 adjusts quantity of the second light, and improves viewing angle of the second light.

Figure 16:
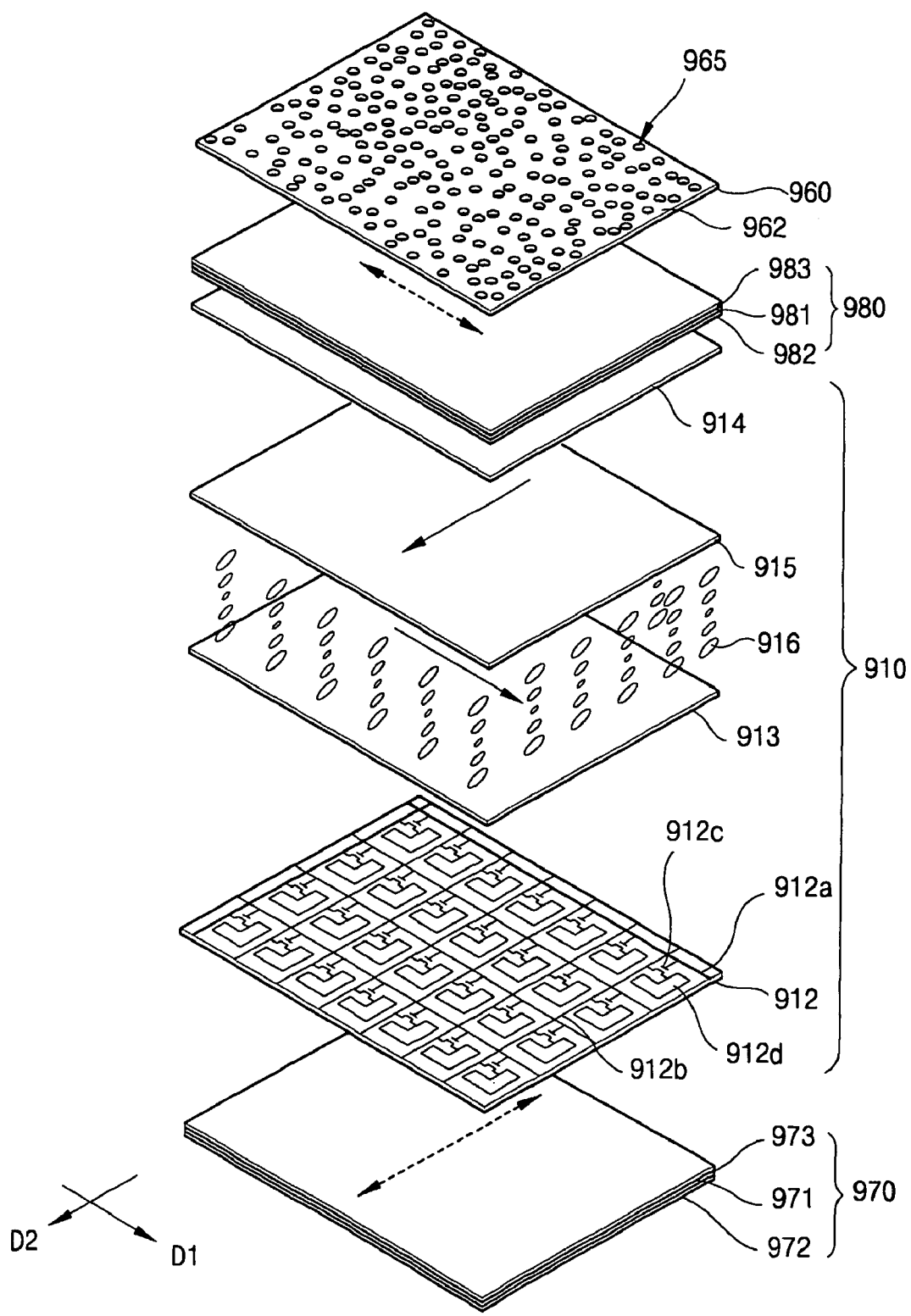
FIG. 16 is a schematic view showing a display unit shown in FIG. 14.

FIG. 16 is a schematic view showing the display unit shown in FIG. 14, in detail.

Referring to FIG. 16, the TFT substrate 912 includes a plurality of gate lines 912*a* extended in a column direction thereof (hereinafter, referred to a first direction D1), and a plurality of data lines 912*b* extended in a row direction thereof (hereinafter, referred to a second direction D2). In addition, a plurality of TFTs 912*c* is arranged on the TFT substrate 912 in a matrix shape. Source electrodes of the TFTs 912*c* are connected to the data lines 912*b*, and gate electrodes of the TFTs 912*c* are connected to the gate lines 912*a*. Drain electrodes of the TFTs 912*c* are connected to pixel electrodes 912*d*.

A first alignment layer 913 is deposited on an entire surface of the TFT substrate 912 having TFTs 912*c* and pixel electrode 912*d*. The first alignment layer 913 includes a polyimid based organic layer and a first rubbing pattern (not shown) formed on the polyimid based organic layer and rubbed in the first direction D1.

For example, the first rubbing pattern is extended precisely the same direction as the first direction D1 in FIG. 16, but the first rubbing pattern can be extended in a tilted direction with respect to the first direction D1 by a predetermined angle. The predetermined angle is determined within a predetermined range, such that the extended direction of the first rubbing pattern does not extremely obviate from the first direction D1.

In addition, the color filter substrate 914 is disposed opposite to the TFT substrate 912. The color filter substrate 914 has color filters (not shown), common electrode (not shown) and a second alignment layer 915. Similar to the first alignment layer 913, the second alignment layer 915 includes a polyimid based organic layer and a second rubbing pattern (not shown), the second rubbing pattern is formed on the polyimid based organic layer, and is rubbed in the second direction D2.

As shown in FIG. 16, if the first rubbing patterns extended in the first direction D1 are formed in the first alignment layer 913, and the second rubbing patterns extended in the second directions D2 are formed in the second alignment layer 915, a process for rubbing the first and second rubbing patterns can be simplified. In other words, when the first and second rubbing patterns are extended in the first and second directions (D1, D2), respectively, the distance of the rubbing process becomes shorter compared when the first and second rubbing patterns are extended in a diagonal direction of a screen of the liquid crystal display device, so that the rubbing process with respect to the first and second alignment layers 913 and 915 can be simplified.

A liquid crystal layer 916 is disposed between the TFT substrate 912 and the color filter substrate 914.

In addition, the lower polarizing plate 970 is disposed below the TFT substrate 912, and the upper polarizing plate 980 is disposed above the color filter substrate 914.

The lower polarizing plate 970 includes a first polarizing layer 971 and first and second supporting layers 972 and 973. The first and second supporting layers 972 and 973 are disposed at a upper and lower surfaces of the first polarizing layer 971 so as to support the first polarizing layer 971. The first polarizing layer 971 polarizes incident light by absorbing light components vibrating in the first direction D1 and by transmitting light components vibrating in the second direction D2 perpendicular to the first direction D1.

The upper polarizing plate 980 includes a second polarizing layer 981 and third and fourth supporting layers 982 and 983. The third and fourth supporting layers 982 and 983 is disposed at a upper an lower surfaces of the second polarizing layer 981 so as to support the second polarizing layer 981. The second polarizing layer 981 polarizes incident light by absorbing light components vibrating in the second direction D2 and by transmitting light components vibrating in the first direction D1.

A first transmission axis extended in the first direction D1 is formed in the first polarizing layer 971, and a second transmission axis extended in the second direction D2 is formed in the second polarizing layer 981, so that cutting errors, which occur during cutting the first and second polarizing layers 971 and 981, can be prevented. Accordingly, productivity of the lower and upper polarizing plates 970 and 980 is improved, and reduces cost for manufacturing of the lower and upper polarizing plates 970 and 980.

Although not shown in FIG. 16, a first and second compensating films for compensating for the viewing angle of the liquid crystal display device 1100 can be disposed at the lower and upper polarizing plates 970 and 980, respectively. Preferably, a direction of rubbing discotic liquid crystal formed in the first compensating film is parallel to the first direction D1, and a direction of rubbing the discotic liquid crystal formed in the second compensating film is parallel to the second direction D2.

As shown FIG. 16, the first rubbing pattern is extended in the first direction D1, and the second rubbing pattern is extended in the second direction D2, but the present invention does not limited to these structures. Specifically, on the consumption that the first rubbing pattern is aligned perpendicular to the second rubbing pattern, each of the first and second rubbing patterns can be extended in an upper, lower, left and right directions with respect to a front of the screen of the liquid crystal display device. The directions of the first and second transmission axes formed in the first and second polarizing plates 970 and 980 vary in correspondence with the variations of the first and second rubbing patterns.

Referring to FIGS. 14 to 16, the porous film 960 having a size corresponding to a size of the liquid crystal display panel 910 is aligned on the liquid crystal display panel 910. The porous film 960 includes a first incident surface 961 toward which second light exited from the liquid crystal display device 910 is incident, an exiting surface 962 for outputting second light, and sidewalls 963 connecting the first incident surface 961 to the exiting surface 962. A plurality of pores 965 extended from the incident surface 961 to the exiting surface 962 are formed in the porous film 960.

Accordingly, the porous film 960 includes a plurality of sidewalls 964. The sidewalls 964 connect the incident surface 961 to the exiting surface 962, and define the pores 965. The sidewalls change the path of the second light, thereby outputting third light to provide expanded viewing angle.

Figure 17:
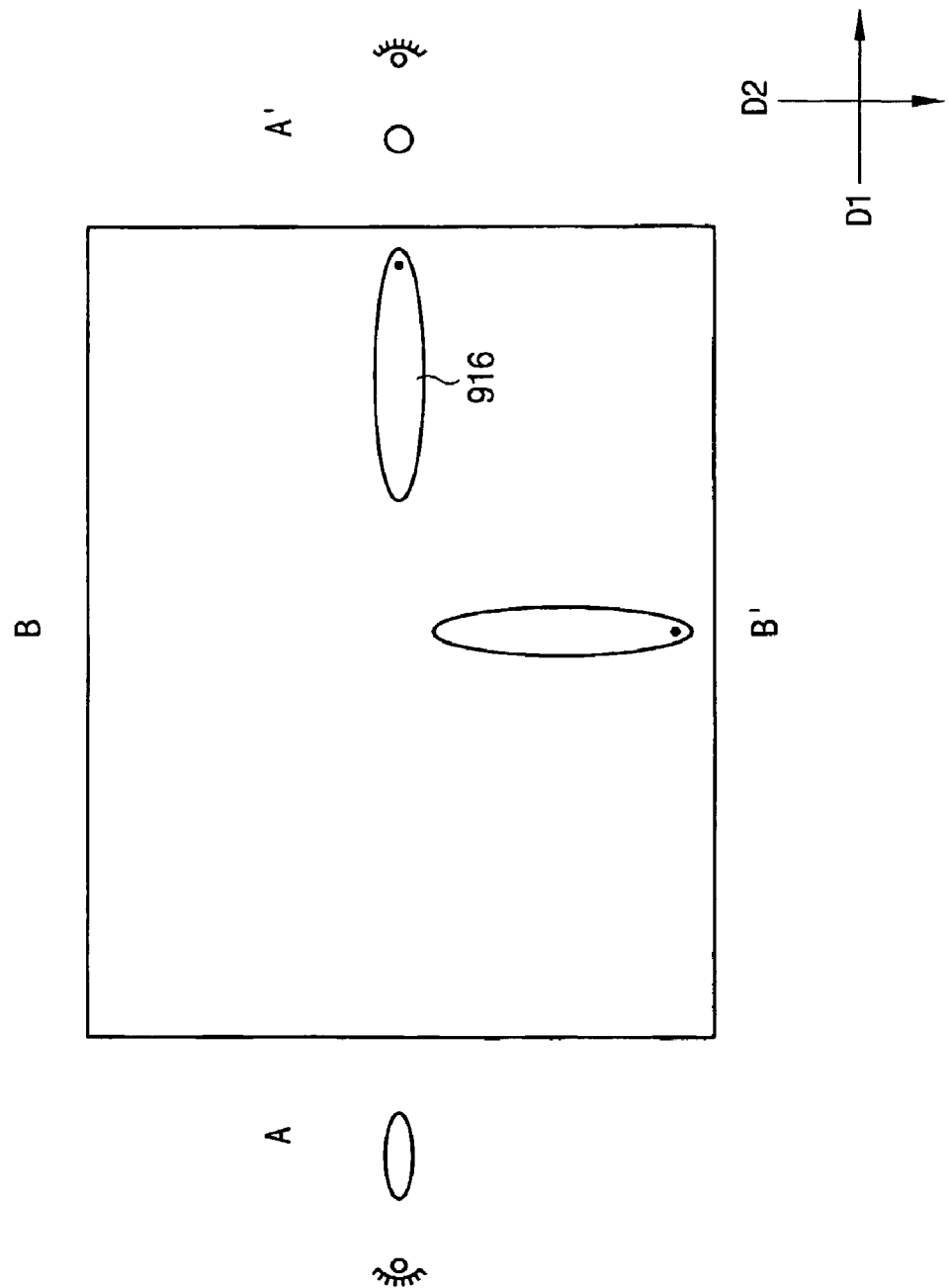
FIG. 17 is a schematic view showing a viewing angle characteristic according to rubbing directions of first and second alignment layers shown in FIG. 16.
Figure 18:
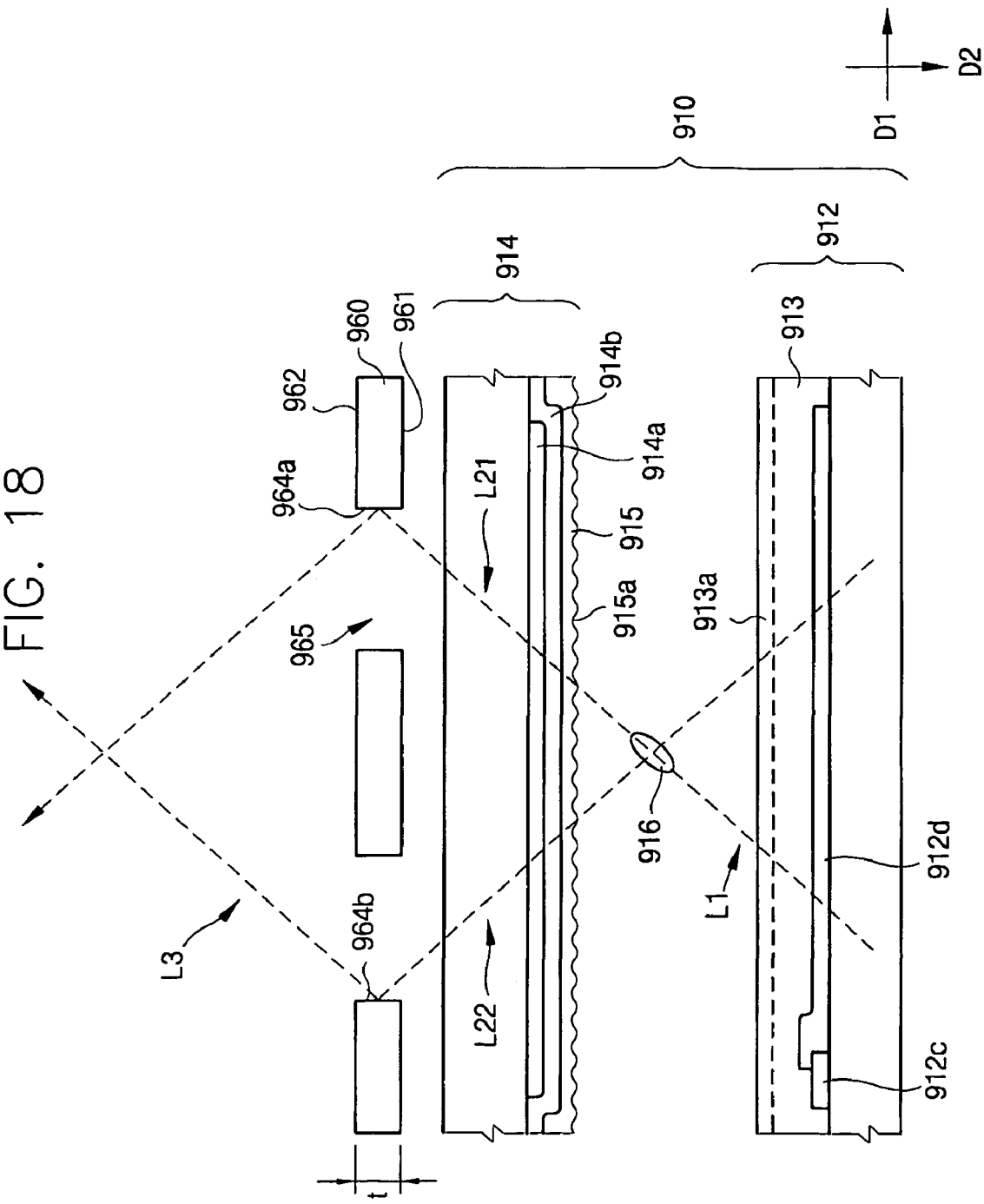
FIG. 18 is a schematic view showing a light path to be changed by a porous film shown in FIG. 14.

FIG. 17 is a schematic view showing viewing angle characteristic according to rubbing directions of first and second alignment layers shown in FIG. 16, and FIG. 18 is a schematic view showing the light path to be changed by the porous film. In FIG. 17, left and right sides with respect to a front of the screen are marked as A and A', respectively, and, upper and lower sides with respect to a front of the screen are marked as B and B', respectively.

Referring to FIG. 17, a first rubbing pattern rubbed in the right direction A' is formed in the first alignment layer, and a second rubbing pattern rubbed in the downward direction B' is formed in the second alignment layer. The liquid crystal 916 adjacent to the first second rubbing patterns is aligned along the first rubbing pattern to be tilted in the right direction (A'), and the liquid crystal 916 adjacent to the second rubbing patterns is aligned along the second rubbing pattern to be tilted in the downward direction (B'). Points shown in FIG. 17 represent a tilted direction of the liquid crystal 916.

If the liquid crystal is tilted toward the right side A', a user catches light passing through the long axis of liquid crystal 916 when the user watch the screen from the right side A' above the screen, and the user catches light passing though the short axis of liquid crystal 916 when the user watch the screen from the left side B' above the screen. The light passed through the long axis of liquid crystal 916 has a less quantity of light compared with the light passed through the short axis of liquid crystal 916. Accordingly, luminance variation is generated in the right and left directions A' and A.

In order to compensate for the luminance variation, the porous film 960 is provided to the liquid crystal display device 1100. Hereinafter, the luminance variation will be described in FIG. 18. Since lower and upper polarizing plates are not illustrated in FIG. 18, they will not be described below.

Referring to FIG. 18, the liquid crystal display panel 910 includes the TFT substrate 912, the color filter substrate 914 and liquid crystal 916. The TFT substrate 912 has the TFTs 912c, the pixel electrode 912d and the first alignment layer 913. The color filter substrate 914 is opposite to the TFT substrate 912 and has color filters 914a, common electrode 914b and the second alignment layer 915. Liquid crystal 916 is disposed between the TFT substrate 912 and the color filter substrate 914.

When voltage is applied to both the pixel electrode 912b and the common electrode 914b, an electric field is formed between the pixel electrode 912b and the common electrode 914b. Accordingly, an alignment angle of liquid crystal 915 varies, and quantity of light incident into the liquid crystal display panel 910 is adjusted, to thereby output second light L2 having a predetermined quantity of light. Then, second light L2 is incident into the porous film 960. According to FIG. 18, the second light L2 is incident into a first sidewall 964a and reflected thereby at a predetermined angle. The first sidewall 964a reflects a group of second light L2 having a first incident angle larger than a critical angle of the porous film 960.

The size of the pores 965 is preferably smaller than the size of a unit pixel formed on the TFT substrate 912. In addition, thickness t of the porous film 960 is preferably in a range about 5 to 100 μm.

As shown in FIG. 18, when the electric field is formed between the pixel electrode 912d and the common electrode 914b, the long axis of liquid crystal 916 is tilted by a predetermined angle with respect to the first direction D1. When the first light L1 is provided to the liquid crystal display panel 910, the first light L1 has some quantity of light adjusted by the tilted liquid crystal 916, so that the second light L2 having image information is exited.

On the assumption that liquid crystal 916 is tilted in the first direction D1, the first group of light L21 reflected by the first sidewall 964a is outputted through the long axis of liquid crystal 916, and the second group of light L22 reflected by a second sidewall 964b opposite to the first sidewall 964a is outputted through the short axis of liquid crystal 916.

Since the first group of light L21 passes through the long axis of liquid crystal 916, relatively large loss of light will be caused while the first group of light L21 passes through the liquid crystal 916. On the contrary, since the second group of light L22 passes through the short axis of liquid crystal 916, relatively small loss of light will be caused while the second group of light L22 passes through liquid crystal 916. Therefore, the first group of light L21 has a quantity of light less than that of the second group of light L22.

The path of the first group of light L21 reflected by the first sidewall 964a is changed to proceed in a direction parallel to the long axis of liquid crystal 916. In addition, the path of the second group of light L22 reflected by the second sidewall 964b is changed to proceed in a direction parallel to the short axis of liquid crystal 916. Accordingly, the luminance variation can be reduced at the left and right sides A and A'.

Referring again to FIGS. 17 and 18, the viewing angle of the liquid crystal display device 1100 is expanded since the first and second rubbing patterns 913a and 915a formed on the first and second alignment layers 913 and 915 are rubbed in the first and second directions D1 and D2, respectively. In detail, left and right viewing angles of the liquid crystal display device 1100 are expanded according as luminance increases in a white mode of the liquid crystal display device 1100. In addition, upper and lower viewing angles are improved according as luminance decreases in a black mode of the liquid crystal display device 1100.

According to the above principle, luminance can be increased in the white mod by providing the first and second rubbing patterns 913a and 915a extended in the right and lower directions A' and B', respectively, in the liquid crystal display device 1100. In addition, it is possible to prevent light from being leaked in the black mode of the liquid crystal display device 1100, so that luminance is reduced in the black mode. Thus, the left and right viewing angles and the upper and lower viewing angles of the liquid crystal display device 1100 can be expanded.

Figure 19:
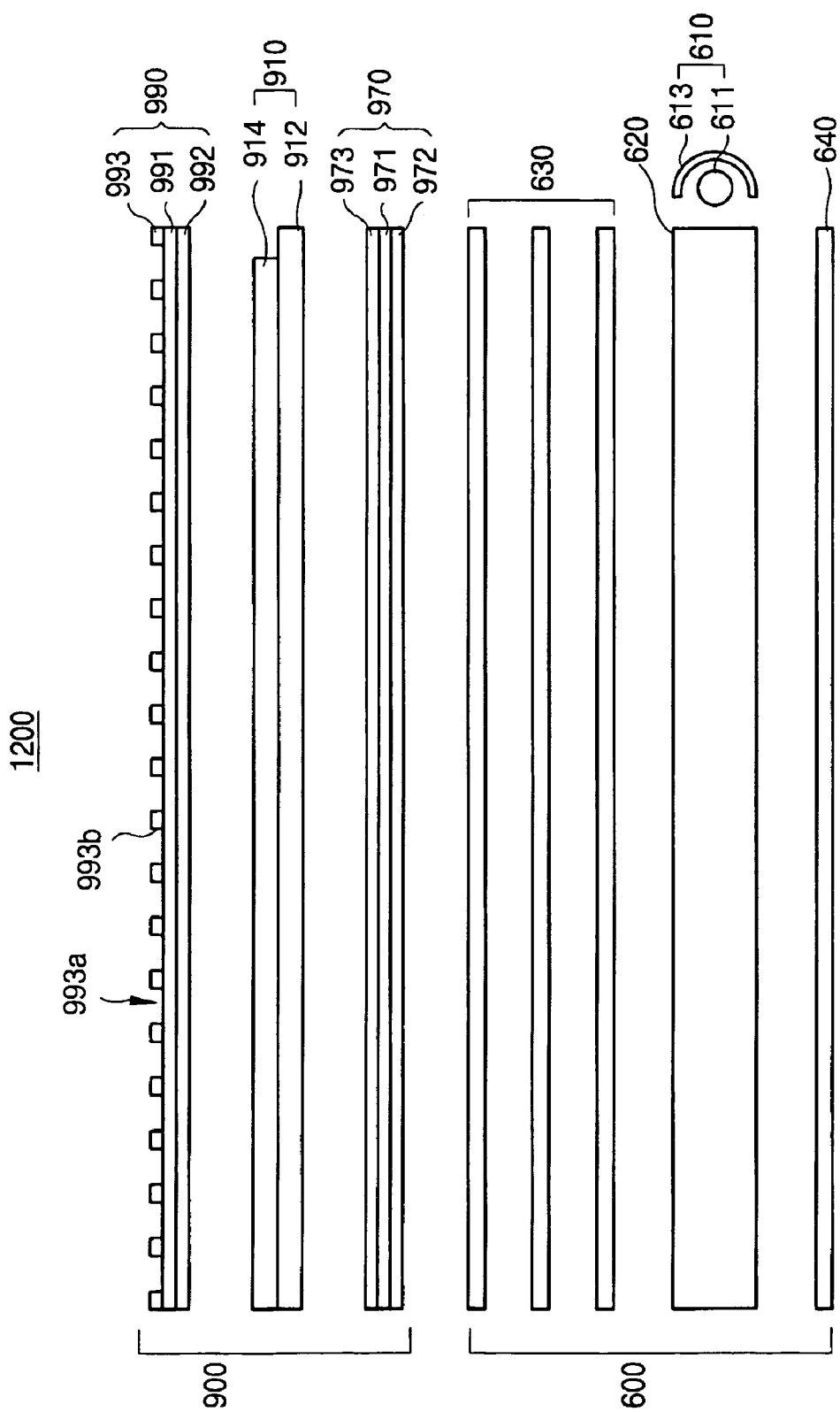
Figure 20:
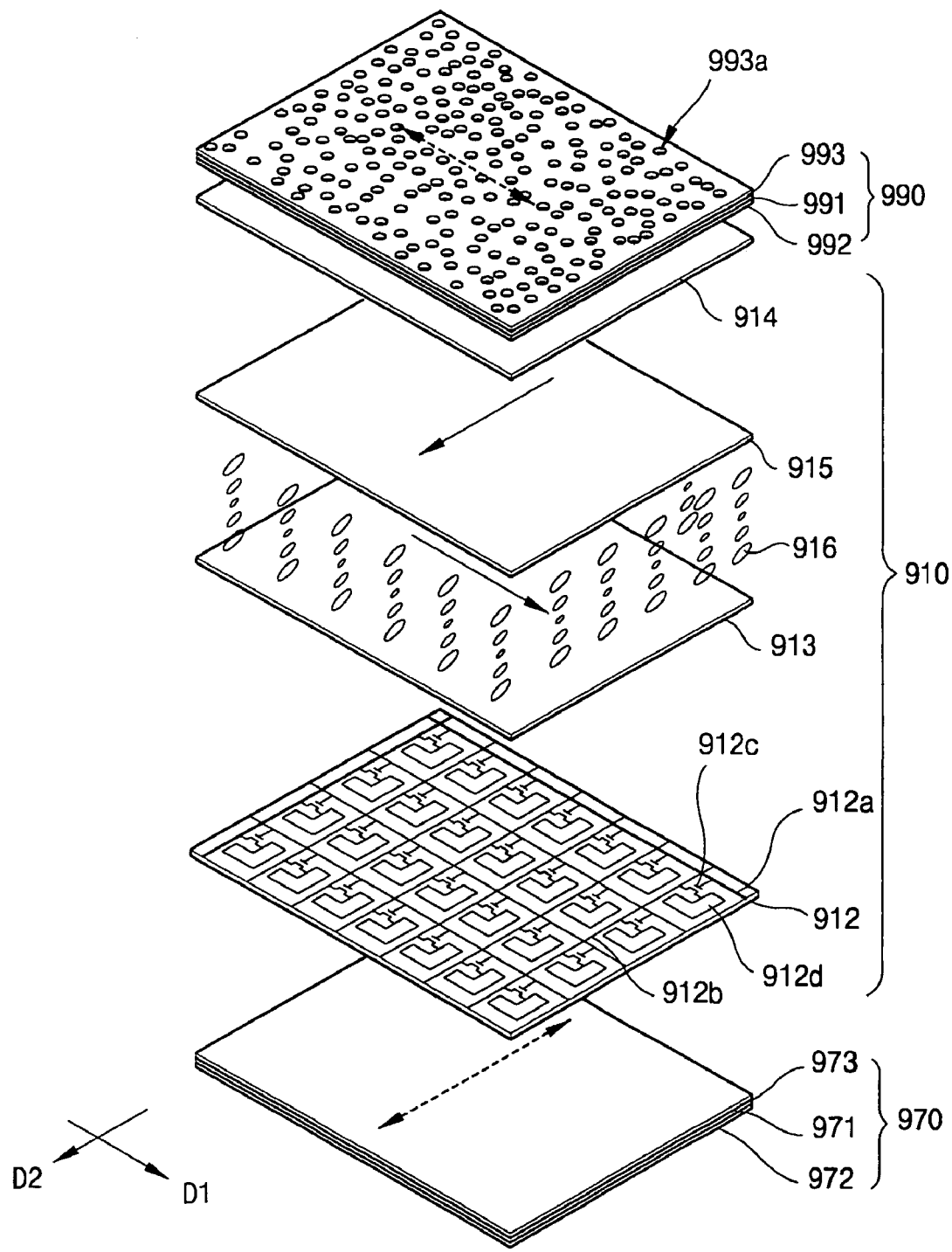
FIG. 20 is a perspective view showing a display unit shown in FIG. 19.

FIGS. 19 and 21 are sectional views showing a liquid crystal display device 1200 according to an exemplary fourth embodiment of the present invention, and FIG. 20 is a perspective view showing a display unit 900 shown in FIG. 19.

Referring to FIG. 19, the liquid crystal display device 1200 includes the display unit 900 for displaying images and a backlight unit 600 for generating light. The display unit 900 has a liquid crystal display panel 910, a lower polarizing plate 970 disposed below the liquid crystal display panel 910, and an upper polarizing plate 990 disposed above the liquid crystal display panel 910.

As shown in FIG. 20, the liquid crystal display panel 910 includes a TFT substrate 912, a color filter substrate 914 and liquid crystal 916 disposed between the TFT substrate 912 and the color filter substrate 914.

In detail, the TFT substrate 912 has a plurality of gate lines 912a extended in the first direction, and a plurality of data lines 912b extended in the second direction D2. In addition, a plurality of TFTs 912c is arranged on the TFT substrate 912 in a matrix shape. That is, source electrodes of the TFTs 912c are connected to the data lines 912b, and gate electrodes of the TFTs 912c are connected to the gate lines 912a. Drain electrodes of the TFTs 912c are connected to pixel electrodes 912d. A first alignment layer 913 is deposited on an entire surface of the TFT substrate 912 having the TFT 912c and the pixel electrode 912d. An organic layer comprised of polyimid series material is deposited on the first alignment layer 913, and then a first rubbing pattern (not shown) rubbed in the first direction D1 is formed on the organic layer.

In addition, a color filter substrate 914 faces the TFT substrate 912. The color filter substrate 914 includes color filters (not shown), common electrode (not shown) and a second alignment layer 915. Similar to the first alignment layer 913, an organic layer comprised of polyimid series material is deposited on the second alignment layer 915, and then a second rubbing pattern (not shown) rubbed in the second direction D2 is formed on the organic layer.

The lower polarizing plate 970 is disposed between the TFT substrate 912 and an optical sheet 630, and the upper polarizing plate 990 is disposed above the color filter substrate 914.

The lower polarizing plate 970 includes a first polarizing layer 971 and a first and a second supporting layers 972 and 973. The first polarizing layer 971 polarizes light. The first and second supporting layers 972 and 973 is disposed on an upper a lower surfaces of the first polarizing layer 971 so as to support the first polarizing layer 971.

The first polarizing layer 971 is formed by adsorbing iodine or dichromatic dyes onto a PVA layer, the PVA layer has a transmission axis extended in the first direction D1.

The upper polarizing plate 990 includes a second polarizing layer 991 for polarizing light, a third supporting layer 992 disposed on a lower surface of the second polarizing layer 991, and a porous layer 993 disposed on an upper surface of the second polarizing layer 991. The porous layer 993 has a plurality of pores 993a. The porous layer 993 includes sidewalls 993b, each sidewall 993b is defined by each pore 993a. The sidewalls 993b partially change the path of the light incident into the upper polarizing plate 990, thereby exiting light to provide expanded viewing angle.

As mentioned above, since the upper polarizing plate 990 has the porous layer 993 on the second polarizing layer 991, the upper polarizing plate 990 polarizes third light and improves the viewing angle of a polarized third light. On the other hand, the porous layer 993 can be formed on the lower surface of the second polarizing layer 991, which will be described later with reference to FIG. 21.

Although it is illustrated that the first rubbing pattern is extended in the first direction D1 and the second rubbing pattern is extended in the second direction D2, the present invention does not limited to these structures. In detail, on the assumption that the first rubbing pattern is aligned perpendicular to the second rubbing pattern, each of the first and second rubbing patterns can be extended in upper, lower, left or right directions when viewed from a front of the screen of the liquid crystal display device. Directions of the first and second transmission axes formed in the first and second polarizing layers 971 and 991 vary according as directions of the first and second rubbing patterns vary.

Referring to FIG. 21, an upper polarizing plate 995 aligned above the color filter substrate 914 includes a second polarizing layer 996 for polarizing light, a porous layer 998 formed on a lower surface of the second polarizing layer 996, and a third supporting layer 997 formed on an upper surface of the second polarizing layer 996.

Since the porous layer 998 is disposed on the lower surface of the second polarizing layer 996, the third light exited from the liquid crystal display device 910 provide expanded viewing angle, then polarized by the second polarizing layer 996 to output fourth light.

Hereinafter, gray scale inversion characteristic according to variation of viewing angles of the liquid crystal display device 1100 having the porous film 960 will be described in detail with reference to simulation results.

Figure 22A:
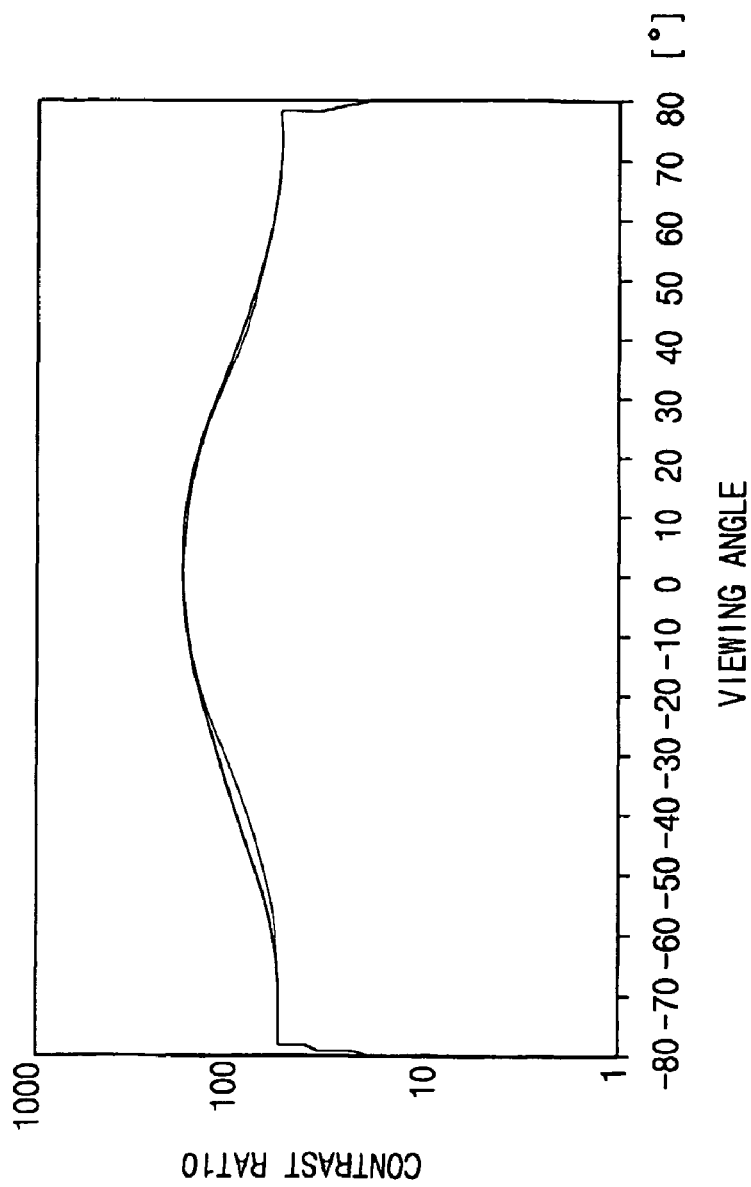
FIGS. 22A to 22C are graphs showing simulation results obtained through experiment 1 according to the present invention.
Figure 22B:
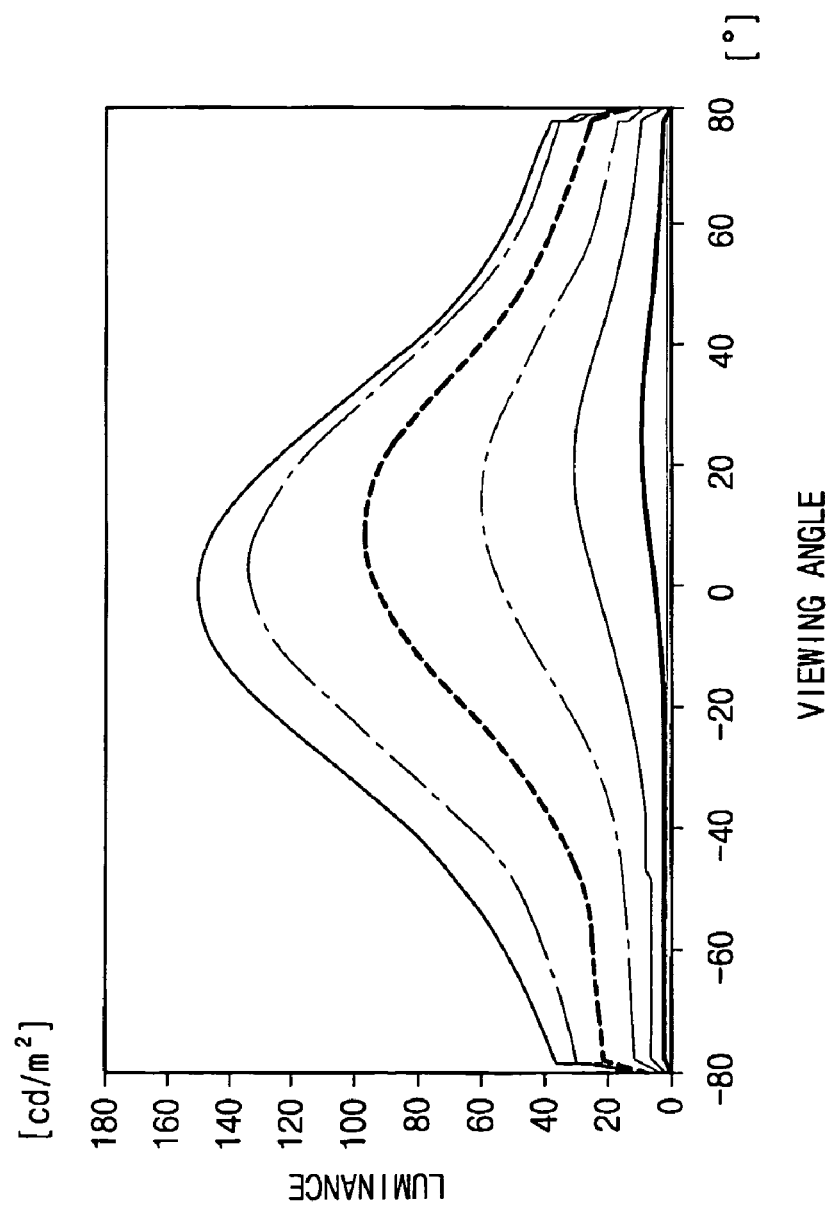
Figure 22C:
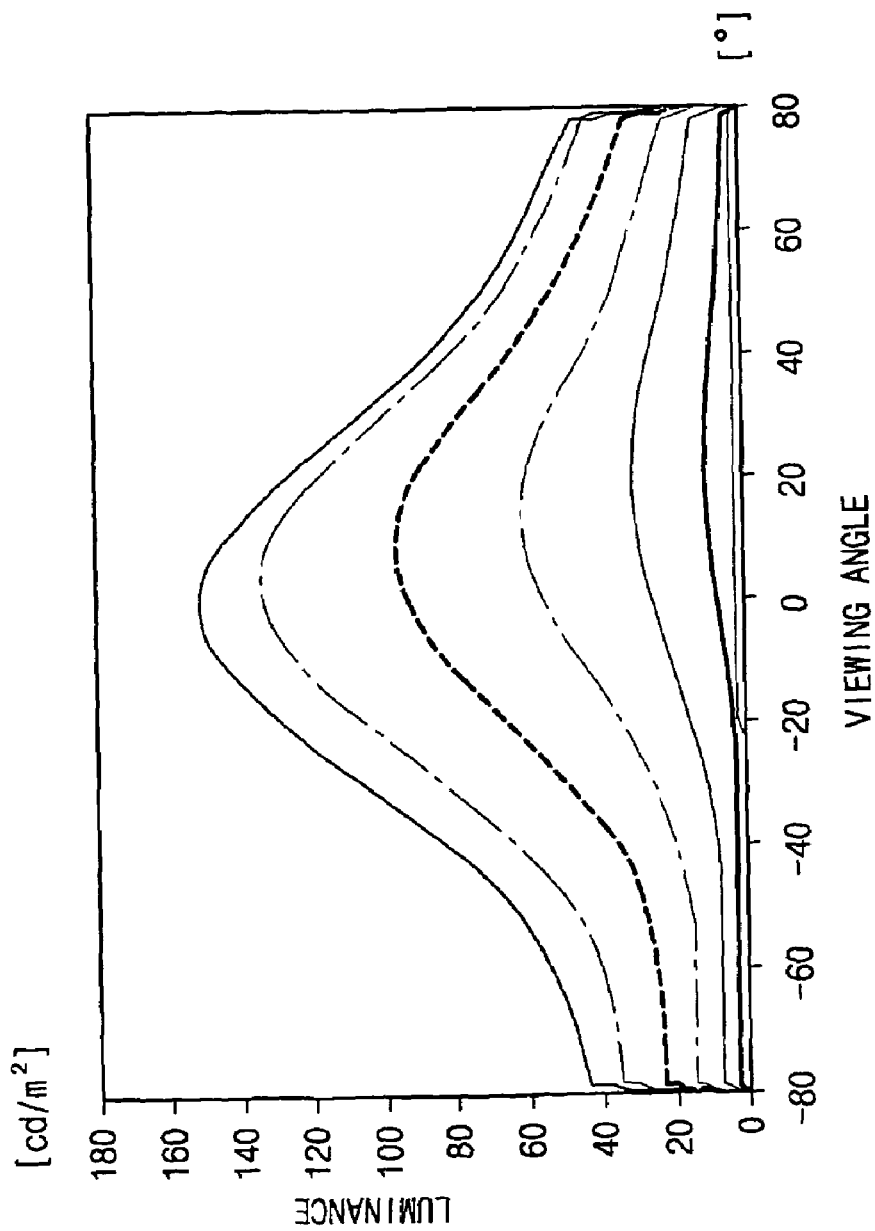
Figure 23A:
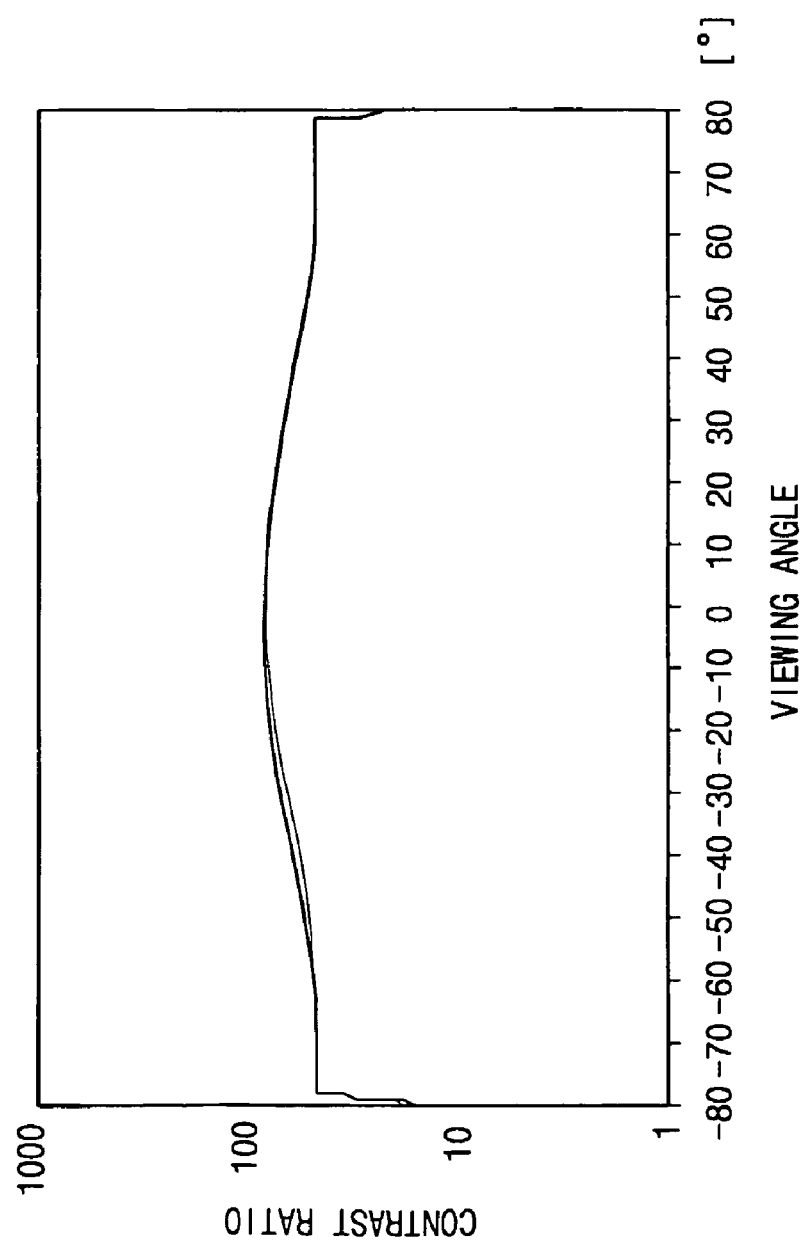
FIGS. 23A to 23C are graphs showing simulation results obtained through experiment 2 according to the present invention.
Figure 23B:
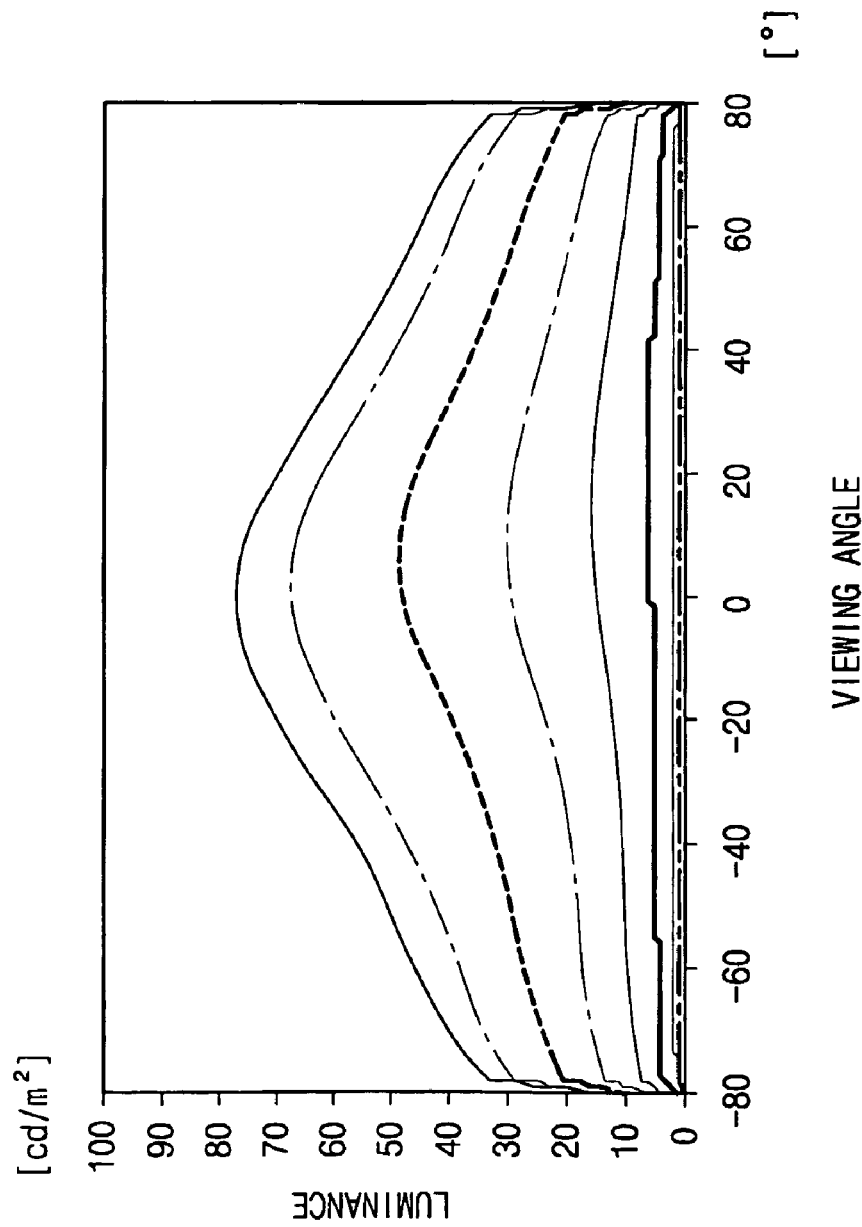
Figure 23C:
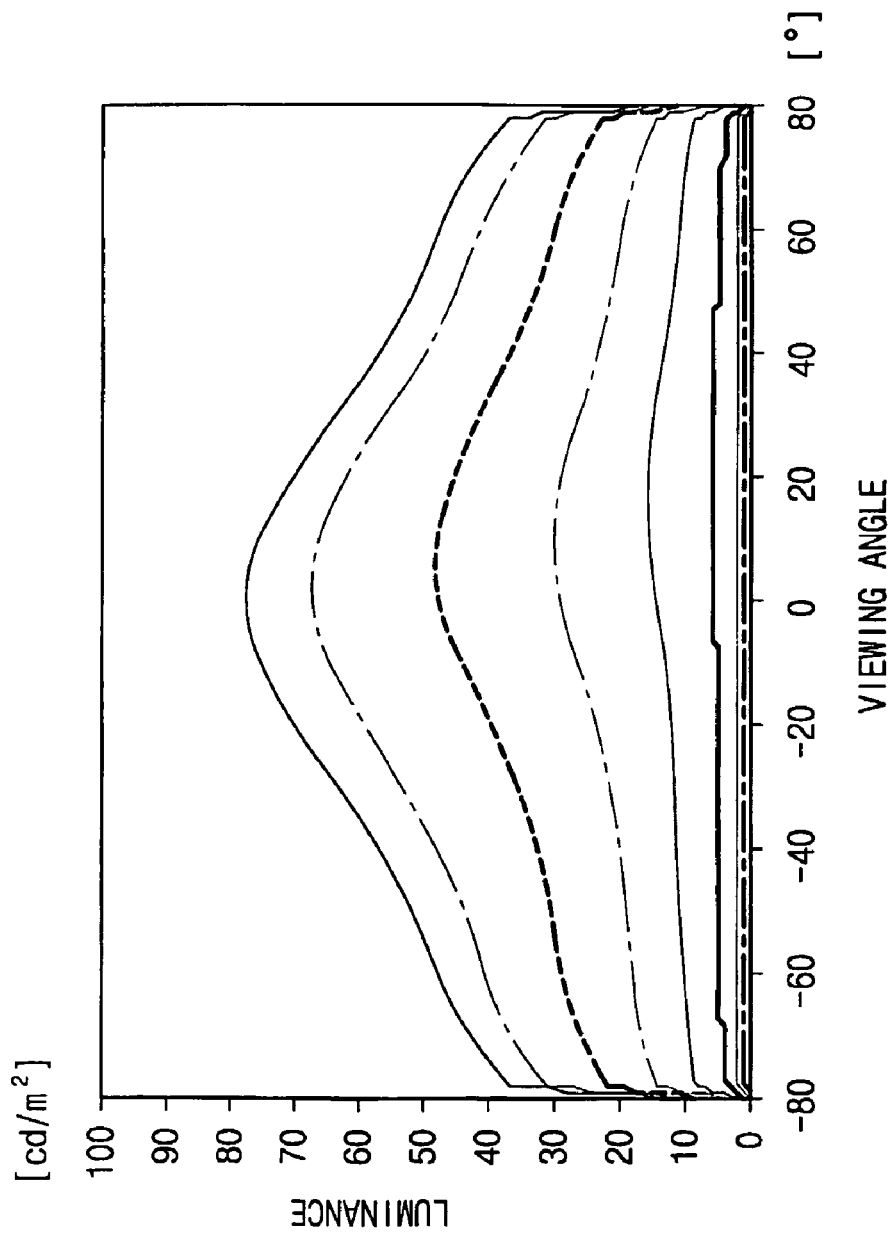

FIGS. 22A to 22C are graphs showing simulation results obtained through experiment 1 according to the present invention, and FIGS. 23A to 23C are graphs showing simulation results obtained through experiment 2 according to the present invention. In Experiments 1 and 2, the liquid crystal display device has a porous layer, and a first and second alignment layers having a first and a second rubbing patterns rubbed in a vertical or a horizontal direction. In detail, in experiment 1, the porous film has a thickness of about 11 μm, and each pore formed in the porous film has a diameter of about 5 μm. In addition, in experiment 2, the porous film has a thickness of about 18 μm, and each pore formed in the porous film has a diameter of about 1 μm.

Figure 24A:
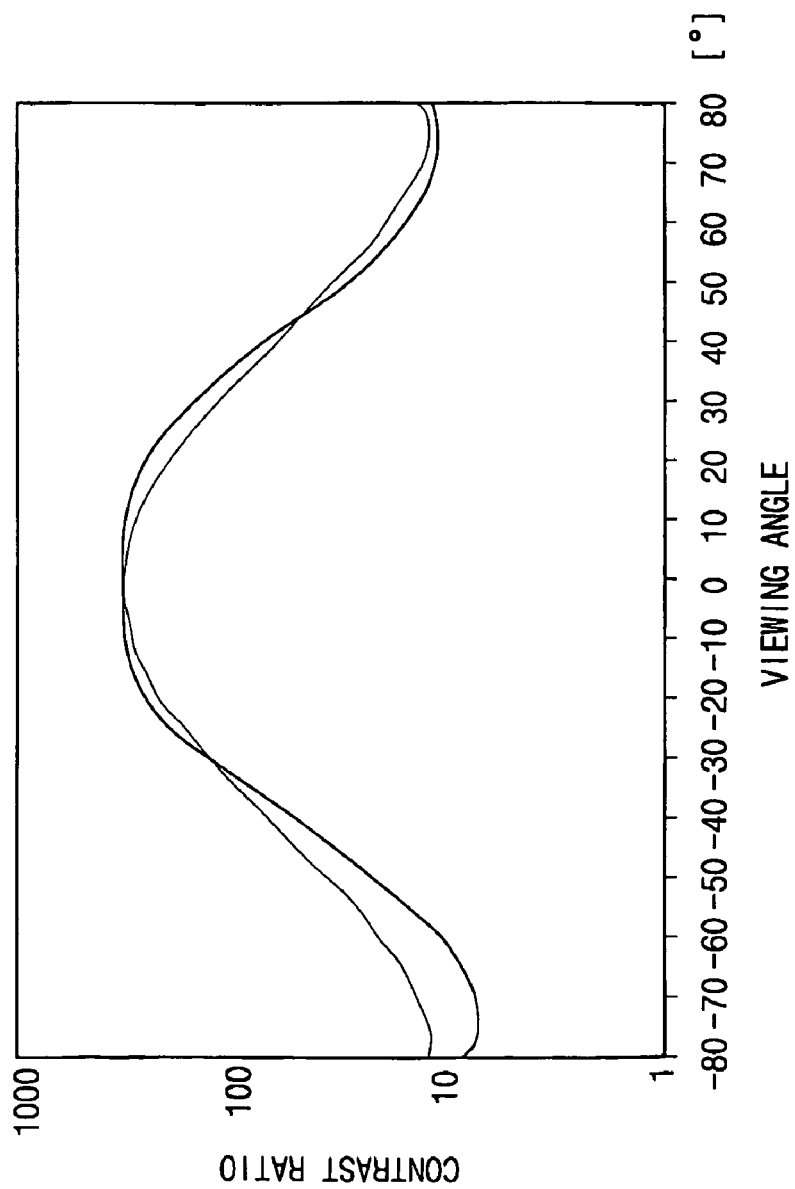
Figure 24C:
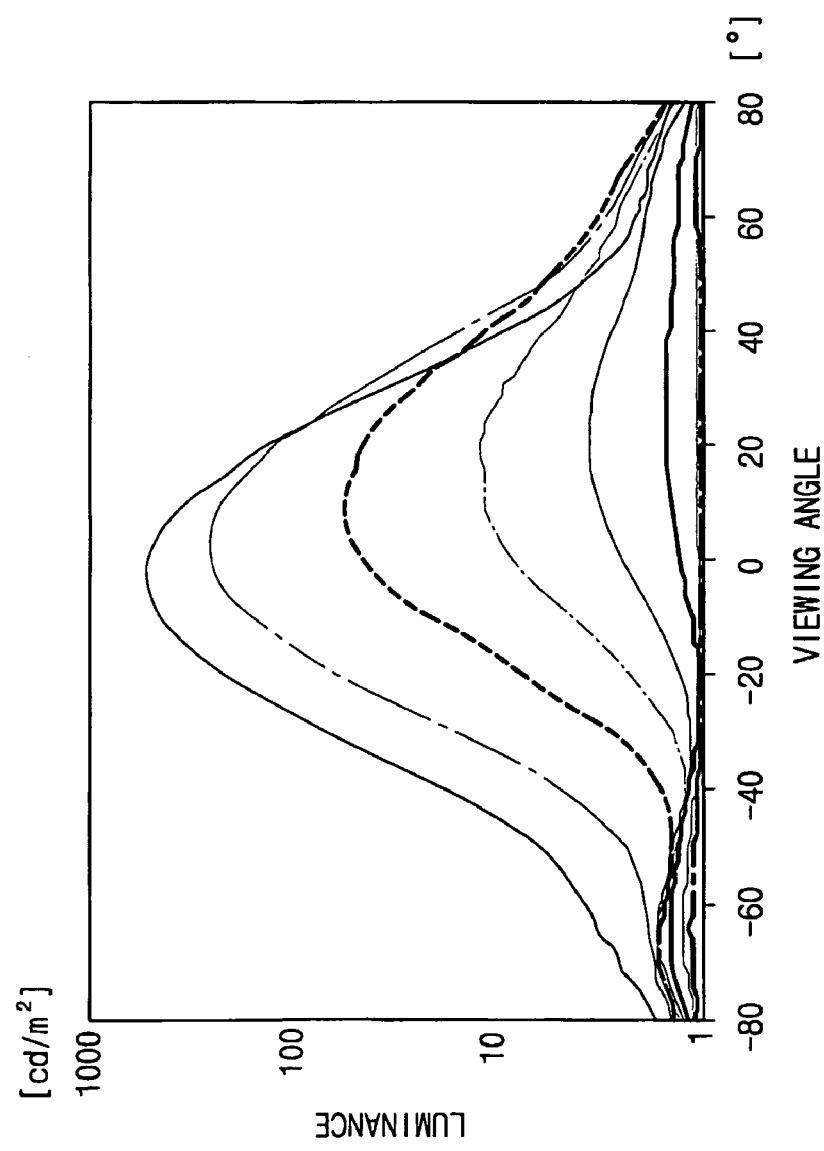
Figure 25A:
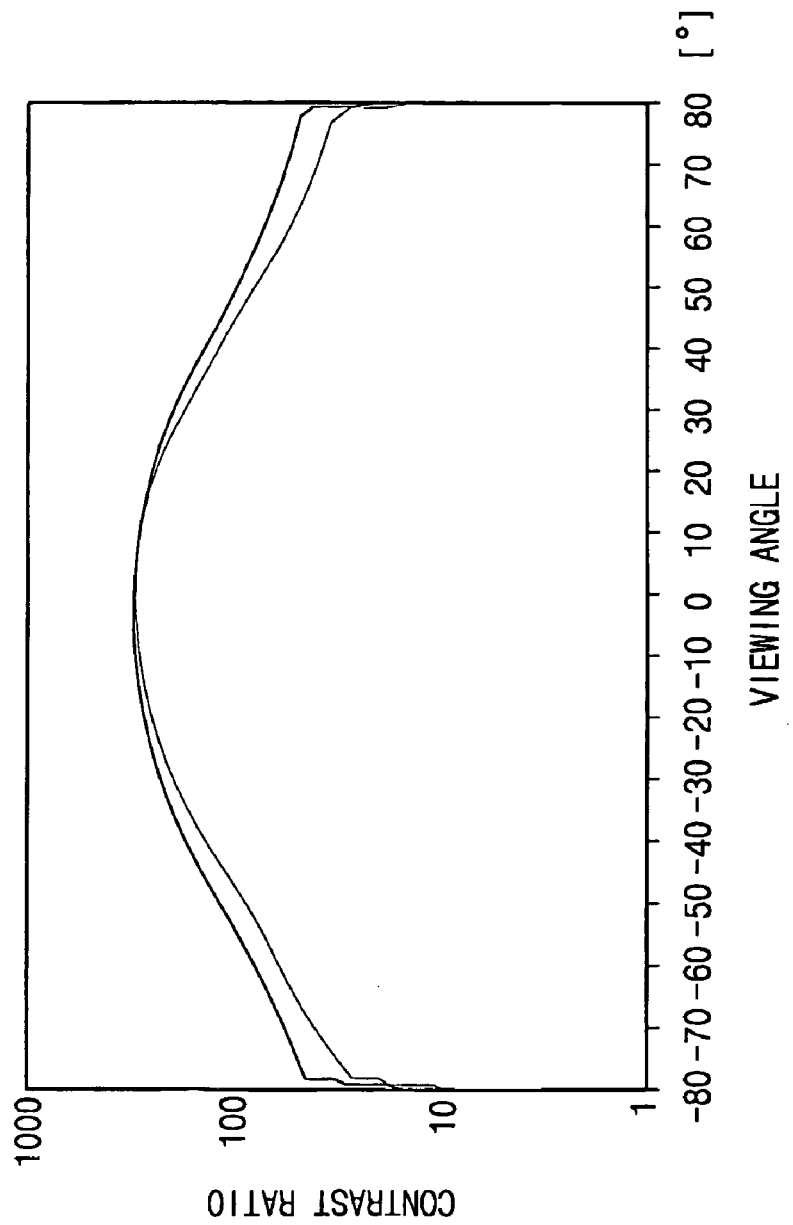
FIGS. 25A to 25C are graphs showing simulation results obtained through comparative experiment 2.
Figure 25B:
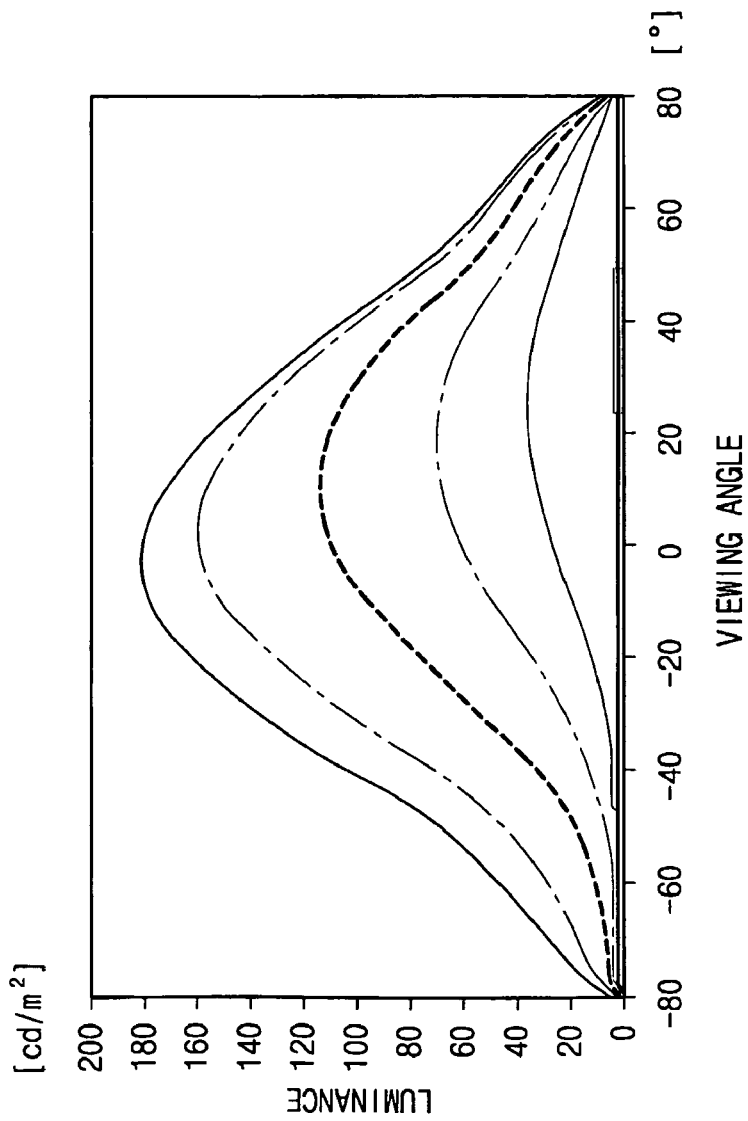
Figure 25C:
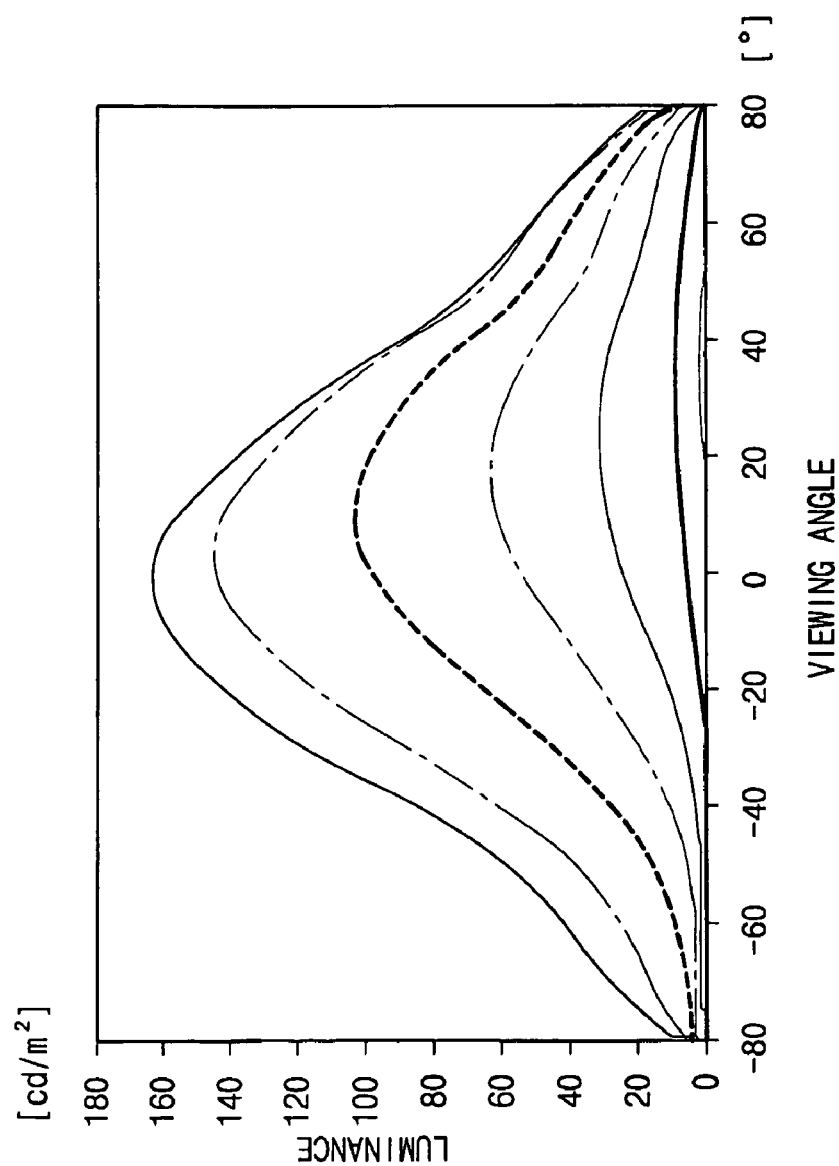

FIGS. 24A to 24C are graphs showing simulation results obtained through comparative experiment 1, and FIGS. 25A to 25C are graphs showing simulation results obtained through comparative experiment 2. In the comparative experiment 1, rubbing patterns rubbed in a diagonal direction are formed on the first and second alignment layers. In comparative experiment 2, rubbing patterns rubbed in vertical and horizontal directions are formed on the first and second alignment layers.

In FIGS. 22A, 23A, 24A, and 25A, an X-axis represents a viewing angle, and a Y-axis represents a contrast ratio. In addition, when viewing the screen of the liquid crystal display device 1100 from a front thereof, a vertical direction is defined as a direction extended from an upper portion to a lower portion of the screen, and a horizontal direction is defined as a direction extended from a left side to a right side of the screen. In the FIGS. 22A, 23A, 24A, and 25A, a bold solid line represents the contrast ratio according to variation of viewing angles when viewing the screen along the vertical direction. In addition, a thin solid line represents the contrast ratio according to variation of viewing angles when viewing the screen along the horizontal direction.

On the other hand, in FIGS. 22B, 22C, 23B, 23C, 24B, 24C, 25B and 25C, an X-axis represents a viewing angle (°), and a Y-axis represents luminance (cd/m$^2$). In detail, FIGS. 22B, 23B, 24B, and 25B show luminance variation according to variation of viewing angles when viewing the screen along the horizontal direction. FIGS. 22C, 23C, 24C, and 25C show variation of luminance according to variation of viewing angles when viewing the screen along the vertical direction. Each curve of each graph shown in FIGS. 22B to 25C represents one of 8-gray scales made by dividing 64-gray scales into 8-gray scales.

Referring to FIGS. 24A and 25A, the contrast ratio varies depending on the viewing angle. That is, the contrast ratio is the highest at the front of the screen and greatly decreases according as the distance between the front of the screen and an observation point increase. Especially, the contrast ratio greatly decreases according as the distance between the front of the screen and the observation point increases along the vertical and horizontal directions. A distribution of the contrast ratio is asymmetric depending on the vertical direction or the horizontal direction.

As a result, the contrast ratio can be varied depending on each direction. Namely, the contrast ratio can be varied depending on the direction from which a user watches the screen.

Referring to FIGS. 22A and 23A, the contrast ratio according to the viewing angles is substantially constant, especially the contrast ratio is hardly varied when viewing the screen along the vertical and horizontal direction. Especially, since the size of pores used in experiment 2 is smaller than the size of pores used in experiment 1, the contrast ratio is more uniform in experiment 2 than in experiment 1.

As shown in FIGS. 24B, when viewing the screen along the horizontal direction, the gray scale inversion does not occur and the asymmetric distribution of the contrast ratio is not created. However, as shown in FIGS. 24C, when viewing the screen along the vertical direction, the gray scale inversion occurs. Especially, as shown in FIGS. 24C, when viewing the screen along the vertical direction, the gray scale inversion occurs at an upper portion of the curves where the viewing angel is about 24° and at a lower portion of the curves where the viewing angel is about −44°. Accordingly, the viewing angle of the liquid crystal display device is limited.

In addition, referring to FIGS. 25B and 25C, when viewing the screen along the vertical direction, the viewing angle is expanded compared with a comparative experiment. That is, the gray scale inversion is reduced when viewing the screen along the vertical direction. However, as shown in FIG. 25B, luminance variation is generated between the left and right portions of the graph. That is, the asymmetric distribution of the luminance is generated between the left and right portions of the graph.

However, referring to FIGS. 22B, 22C, 23B and 23C, luminance increases according as each gray scale becomes higher even when the distance between the front of the screen and the observation point increase. Thus, the viewing angle of the liquid crystal display device can be expanded. In addition, as shown in FIGS. 22B and 23B, luminance is symmetrically distributed between the left and right portions of the graph.

While the present invention has been described in detail with reference to the preferred embodiments thereof, it should be understood to those skilled in the art that various changes, substitutions and alterations can be made hereto without departing from the scope of the invention as defined by the appended claims.

Industrial Applicability

According to the liquid crystal display device of the present invention, a porous film has sidewalls defined by a plurality of pores. The sidewalls of the porous film reflect a first group of light of the second light. The second light is exited from a liquid crystal display panel, and the first group of light is light passes through a short axis of liquid crystal. The first group of light is reflected towards a second group of light of the second light, which passes through a long axis of liquid crystal. Since the first group of light having relatively higher luminance is reflected towards the second group of light having relatively lower luminance, a viewing angle is expanded in such a manner that a person can precisely recognize image information displayed in a screen of the liquid crystal display panel from all directions with respect to the screen.

In addition, a lower substrate includes a first alignment layer having a first rubbing pattern extended in a column or row direction, and an upper substrate includes a second alignment layer having a second rubbing pattern extended in a lo row or column direction. Thus, the viewing angle in an upper and lower portions of the screen can be improved due to the rubbing direction of the first and second rubbing patterns.

Furthermore, since the rubbing pattern is formed on the alignment layer in the column or row direction, a length of the rubbing can be shortened when rubbing the alignment layer. Accordingly, the manufacturing process for the liquid crystal display device can be simplified and the manufacturing cost thereof can be saved.

The invention claimed is:

1. A liquid crystal display device comprising:
   a liquid crystal display panel for receiving a first light, and for radiating a second light having an image information, the liquid crystal display panel including:
   i) a first substrate on which a plurality of pixels having a first electrode is formed,
   ii) a second substrate on which a second electrode opposite to the first electrode is formed, and
   iii) a liquid crystal layer, disposed between the first and second substrate, which is aligned by an electric field applied between the first and second electrodes; and
   a light path changing means disposed on the liquid crystal display panel, the light path changing means including a reflection surface, the reflection surface reflecting a part of the second light and outputting a third light having a compensated luminance, and the reflection surface being extended in a first direction perpendicular to an upper surface of the liquid crystal display panel, wherein the light path changing means includes a porous film having a plurality of pores.

2. The liquid crystal display device as claimed in claim 1, wherein the liquid crystal includes nematic liquid crystal.

3. The liquid crystal display device as claimed in claim 1, wherein the reflection surface includes inner sidewalls of the porous film, and each of the inner sidewalls is adjacent to each of the pores.

4. The liquid crystal display device as claimed in claim 1, wherein the porous film has a refractive index larger than the pores.

5. The liquid crystal display device as claimed in claim 1, wherein each of the pores is smaller than the pixels.

6. The liquid crystal display device as claimed in claim 1, wherein the light path changing means has a multi-layered structure.

7. The liquid crystal display device as claimed in claim 6, wherein the light path changing means further includes a supporting layer, the supporting layer being extended in a second direction to fully cover an incident surface of the porous film, the second light being incident through the incident surface.

8. The liquid crystal display device as claimed in claim 6, wherein the light path changing means further includes a first supporting layer extended in a second direction to fully cover an incident surface of the porous film, the second light being incident through the incident surface, and a second supporting layer extended in the second direction to fully cover an exiting surface of the porous film, the third light being exited through the exiting surface.

9. A liquid crystal display device comprising:
   a liquid crystal display panel for receiving a first light, and for radiating a second light having an image information, the liquid crystal display panel including:
   i) a first substrate on which a plurality of pixels having a first electrode is formed,
   ii) a second substrate on which a second electrode opposite to the first electrode is formed, and
   iii) a liquid crystal layer, disposed between the first and second substrate, which is aligned by an electric field applied between the first and second electrodes; and a polarizing plate disposed on the liquid crystal display panel, the polarizing plate including:
i) a polarizing layer for polarizing the second light, and
ii) a light path changing layer including a reflection surface, the reflection surface for reflecting a part of the second light and outputting a third light having a compensated luminance, the reflection surface extended in a first direction perpendicular to an upper surface of the liquid crystal display panel, wherein the light path changing layer includes a plurality of pores.

10. The liquid crystal display device as claimed in claim 9, wherein the light path changing layer is disposed on the polarizing layer.

11. The liquid crystal display device as claimed in claim 10, wherein the reflection surface includes inner sidewalls of the light path changing layer, each of the inner sidewalls being adjacent to each of the pores.

12. The liquid crystal display device as claimed in claim 11, wherein the light path changing layer has a refractive index larger than the pores.

13. The liquid crystal display device as claimed in claim 11, wherein each of the pores is smaller than the pixels.

14. A liquid crystal display device comprising:
a liquid crystal display panel for receiving a first light, and for radiating a second light having an image information, the liquid crystal display panel including:
i) a first substrate on which a plurality of pixels having a first electrode is formed,
ii) a second substrate on which a second electrode opposite to the first electrode is formed, and
iii) a nematic liquid crystal, disposed between the first and second substrate, which is aligned by an electric field applied between the first and second electrodes; and
a light path changing means disposed on the liquid crystal display panel, the light path changing means including a reflection surface, the reflection surface reflecting a part of a first group of the second light towards a second group of the second light, the first group of light of the second light passing through the nematic liquid crystal in a parallel direction with regard to a first axis of the nematic liquid crystal tilted at a predetermined angle by the electric field, the second group of light of the second light passing through the nematic liquid crystal in a parallel direction with regard to a second axis of nematic liquid crystal, and the second axis being perpendicular to the first axis of nematic liquid crystal, wherein the light path changing means includes a porous film having a plurality of pores.

15. The liquid crystal display device as claimed in claim 14, wherein the first group of the second light has a luminance higher than the second group of the second light.

16. The liquid crystal display device as claimed in claim 14, wherein the reflection surface includes inner sidewalls, each of the inner sidewalls being adjacent to each of the pores.

17. The liquid crystal display device as claimed in claim 14, wherein each pore has a size smaller than a size of each pixel.

18. The liquid crystal display device as claimed in claim 14, wherein the porous film has a refractive index larger than a refractive index of pores.

19. A liquid crystal display device comprising:
a liquid crystal display panel for receiving a first light, and for radiating a second light having an image information, the liquid crystal display panel including:
i) a first substrate on which a plurality of pixels having a first electrode is formed,
ii) a second substrate on which a second electrode opposite to the first electrode is formed, and
iii) a nematic liquid crystal, disposed between the first and second substrate, for being aligned by an electric field applied between the first and second electrodes; and
a polarizing plate disposed on the liquid crystal display panel, the polarizing plate including:
i) a polarizing layer for polarizing the second light, and
ii) a light path changing layer including a reflection surface, the reflection surface having a plurality of pores and inner sidewalls adjacent to each of the pores, the inner sidewalls reflecting a part of a first group of light of the second light towards a second group of light of the second light, the first group of light of the second light passing through the nematic liquid crystal in a parallel direction with regard to a first axis of the nematic liquid crystal tilted at a predetermined angle by the electric field, the second group of light of the second light passing through the nematic liquid crystal in a parallel direction with regard to a second axis of nematic liquid crystal, and the second axis being perpendicular to the first axis of nematic liquid crystal.

20. The liquid crystal display device as claimed in claim 19, wherein the first group of light of the second light has luminance higher than luminance of the first group of light.

21. The liquid crystal display device as claimed in claim 20, wherein the light path changing layer is disposed on the polarizing layer.

22. A liquid crystal display device comprising:
a lower substrate including:
i) a plurality of switching devices arranged in a matrix shape on a first substrate,
ii) a first electrode electrically coupled to the switching devices, and
iii) a first alignment layer deposited on the first substrate and having a first rubbing pattern extended in a first direction;
an upper substrate including:
i) a color filter formed on a second substrate,
ii) a second electrode formed on the color filter, and
iii) a second alignment layer deposited on the second electrode and having a second rubbing pattern extended in a second direction; a liquid crystal layer disposed between the upper and lower substrates; and
a light path changing means including a plurality of pores and sidewalls being defined by the pores, the light path changing means disposed on the upper substrate and reflecting a part of a first light to output a second light having a compensated luminance distribution, the first light exited from the upper substrate and being incident into sidewalls of the light path changing means.

23. The liquid crystal display device as claimed in claim 22, further comprising:
a backlight assembly, disposed below the lower substrate, for generating a third light;
a first polarizing means, disposed between the lower substrate and the backlight assembly, for polarizing the third light; and
a second polarizing means, disposed between the upper substrate and the light path changing means, for polarizing the first light.

24. The liquid crystal display device as claimed in claim 23, wherein the first polarizing means includes a first polarizing layer having a first transmission axis parallel to the second direction, and the second polarizing means includes a second polarizing layer having a second transmission axis parallel to the first direction.

25. The liquid crystal display device as claimed in claim 22, wherein the light path changing means includes a porous film having a plurality of pores.

26. A liquid crystal display device comprising:
a lower substrate including:
i) a plurality of switching devices arranged in a matrix shape on a first substrate,
ii) a first electrode electrically coupled to the switching devices, and
iii) a first alignment layer deposited on the first substrate and having a first rubbing pattern extended in a first direction;
an upper substrate including:
i) a color filter formed on a second substrate,
ii) a second electrode formed on the color filter, and
iii) a second alignment layer deposited on the second electrode and having a second rubbing pattern extended in a second direction;
a liquid crystal layer disposed between the upper and lower substrates;
a first polarizing means, disposed on a lower surface of the lower substrate, for polarizing a first light incident into the lower substrate; and
a second polarizing means, disposed on the upper substrate, for polarizing a second light exited from the upper substrate, and for reflecting a part of second light to output a third light having a compensated luminance, and wherein the second polarizing means includes a porous layer having a plurality of pores.

27. The liquid crystal display device as claimed in claim 26, wherein the first polarizing means includes a first polarizing layer having a first transmission axis parallel to the second direction, and the second polarizing means includes a second polarizing layer having a second transmission axis parallel to the first direction.

28. The liquid crystal display device as claimed in claim 27, wherein the porous layer has sidewalls defined by the pores, the second polarizing means is disposed on the second polarizing layer, the porous layer reflects a part of the second light to output a third light having a compensated luminance distribution, and the second light is polarized by the second polarizing layer and is incident into the sidewalls of the light path changing means.

* * * * *